US008248359B2

(12) United States Patent
Inada et al.

(10) Patent No.: US 8,248,359 B2
(45) Date of Patent: Aug. 21, 2012

(54) DISPLAY APPARATUS AND DRIVING METHOD THEREFOR

(75) Inventors: Tetsuji Inada, Tokyo (JP); Mitsuyasu Asano, Tokyo (JP); Yoshihiro Katsu, Kanagawa (JP); Norimasa Furukawa, Tokyo (JP); Ichiro Murakami, Tokyo (JP)

(73) Assignee: Sony Corporation, Tokyo (JP)

( * ) Notice: Subject to any disclaimer, the term of this patent is extended or adjusted under 35 U.S.C. 154(b) by 613 days.

(21) Appl. No.: 11/756,558

(22) Filed: May 31, 2007

(65) Prior Publication Data

US 2007/0296886 A1 Dec. 27, 2007

(30) Foreign Application Priority Data

Jun. 1, 2006 (JP) ................................. 2006-153663
May 30, 2007 (JP) ................................. 2007-142880

(51) Int. Cl.
*G09G 3/36* (2006.01)
(52) U.S. Cl. ........................................................ 345/102
(58) Field of Classification Search .................. None
See application file for complete search history.

(56) References Cited

U.S. PATENT DOCUMENTS

| 7,592,996 | B2 * | 9/2009 | Brown Elliott et al. | 345/102 |
|---|---|---|---|---|
| 2004/0239796 | A1 * | 12/2004 | Imai | 348/362 |
| 2004/0257329 | A1 * | 12/2004 | Park et al. | 345/102 |
| 2005/0184952 | A1 * | 8/2005 | Konno et al. | 345/102 |
| 2005/0248524 | A1 * | 11/2005 | Feng et al. | 345/102 |
| 2006/0044254 | A1 * | 3/2006 | Kirk | 345/102 |
| 2006/0214904 | A1 * | 9/2006 | Kimura et al. | 345/102 |
| 2006/0227125 | A1 * | 10/2006 | Wong et al. | 345/211 |
| 2006/0268180 | A1 * | 11/2006 | Chou | 348/673 |
| 2007/0002000 | A1 * | 1/2007 | Kwon | 345/102 |
| 2007/0097321 | A1 * | 5/2007 | Whitehead et al. | 353/30 |
| 2007/0146295 | A1 * | 6/2007 | Yu et al. | 345/102 |
| 2007/0159451 | A1 * | 7/2007 | Daly | 345/102 |
| 2009/0141212 | A1 * | 6/2009 | Harbers et al. | 349/67 |

FOREIGN PATENT DOCUMENTS

| JP | 2004-258669 | 9/2004 |
|---|---|---|
| JP | 2004-294767 | 10/2004 |
| JP | 2005-258403 | 9/2005 |
| JP | 2006-105693 | 4/2006 |

OTHER PUBLICATIONS

Japanese Office Action for Application No. 2007-142880, dated Mar. 13, 2012, 3 pages.

* cited by examiner

*Primary Examiner* — Bipin Shalwala
*Assistant Examiner* — Daniel Bedell
(74) *Attorney, Agent, or Firm* — Finnegan Henderson Farabow Garrett & Dunner LLP

(57) ABSTRACT

A display apparatus includes a display section, a backlight, and a drive section. The display section is formed from a liquid crystal display apparatus of the transmission type having a display area formed from pixels arranged in a matrix. The backlight is formed from a plurality of light source units disposed individually corresponding to a plurality of display area units which form the display area and configured to illuminate the back side of the display section. The drive section is configured to drive the display section and the backlight based on input signals from the outside. The drive section includes a control section configured to control a light emitting state of the light source unit corresponding to each of the display area units based on a display area unit internal maximum input signal which indicates a maximum value from among the input signals corresponding to the display area unit.

15 Claims, 11 Drawing Sheets

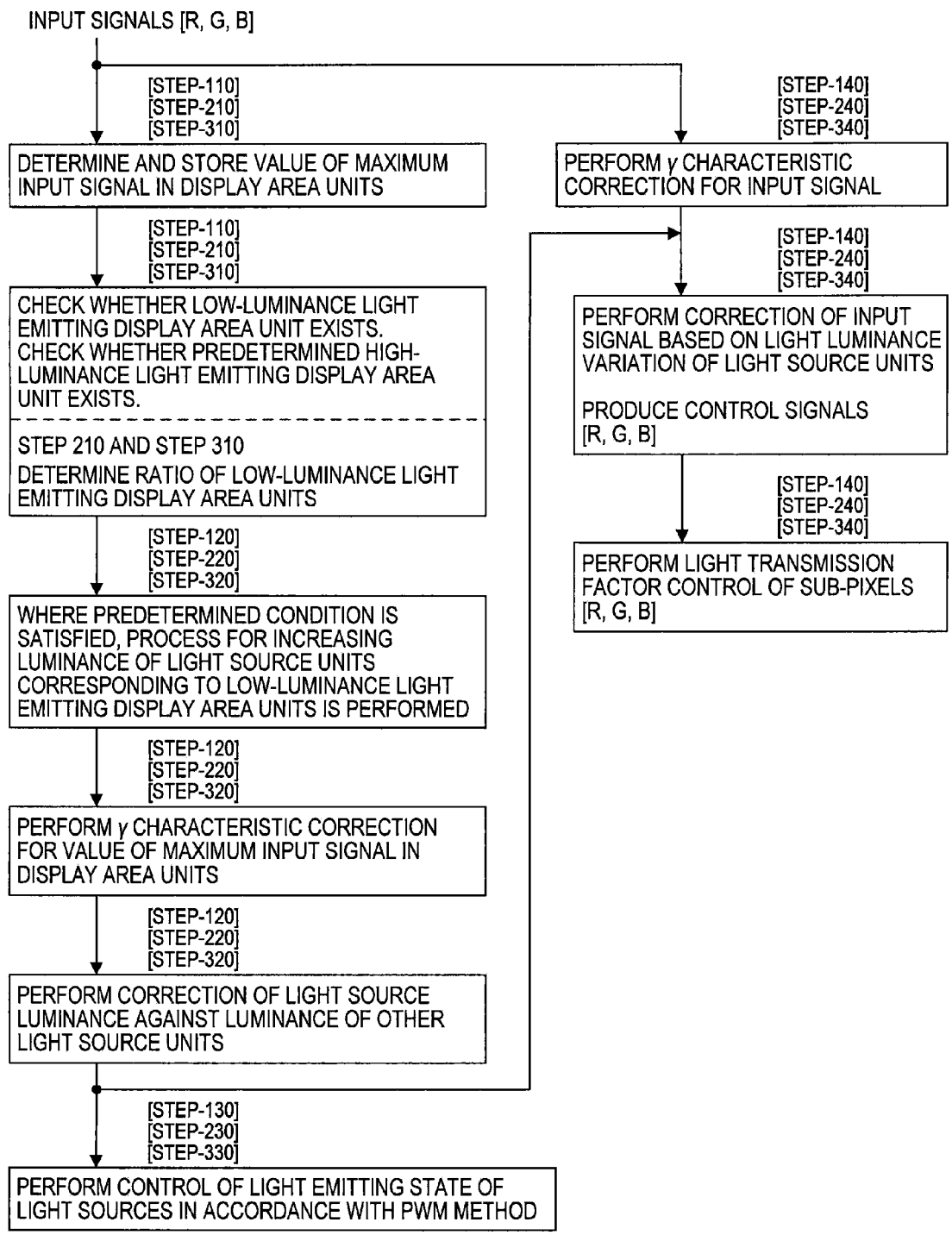

DISPLAY APPARATUS AND DRIVING METHOD THEREFOR

CROSS REFERENCE TO RELATED APPLICATIONS

The present invention contains subject matter related to Japanese Patent Application JP 2006-153663 filed with the Japan Patent Office on Jun. 1, 2006, the entire contents of which being incorporated herein by reference.

BACKGROUND OF THE INVENTION

1. Field of the Invention

This invention relates to a display apparatus which includes a display and a backlight and a driving method for the display apparatus.

2. Description of the Related Art

In a liquid crystal display apparatus, liquid crystal material itself does not emit light. Accordingly, a backlight of the direct type is disposed on the back side of the liquid crystal display apparatus. In a color liquid crystal display apparatus, one pixel is formed typically from three sub-pixels including a red light emitting sub-pixel, a green light emitting sub-pixel and a blue light emitting sub-pixel. A liquid crystal cell which forms each pixel or each sub-pixel operates as an optical shutter (light valve) to control the light transmission factor or numerical aperture of the pixel or sub-pixel thereby to control the light transmission factor of illumination light typically in the form of which light emitted from the backlight to display an image.

In the related art, a backlight illuminated an entire liquid crystal display apparatus uniformly and with a fixed brightness. However, another backlight having a different configuration has been proposed and is disclosed, for example, in Japanese Patent Laid-Open No. 2004-258403. The backlight mentioned includes a plurality of light source units corresponding to a plurality of display area units which form a display area of a liquid crystal display apparatus and includes a mechanism for varying the distribution of the illuminance of the display area units.

By such control of the backlight (also called divisional driving of the backlight), increase of the contrast ratio by increase of the white level and decrease of the black level of a liquid crystal display apparatus can be anticipated. As a result, enhancement of the quality of image display can be anticipated, and reduction of the power consumption of the backlight can be anticipated.

SUMMARY OF THE INVENTION

In a liquid crystal display apparatus, a control signal which controls the light transmission factor of a pixel is supplied from a drive section to each pixel based on an input signal inputted from the outside to the drive section. In this instance, where a backlight is divisionally driven, it may be controlled based on a method described below. In particular, the maximum luminance of light source units which compose the backlight is represented by Ymax, and the maximum value of the light transmission factor (numerical aperture) of the pixels of display area units (the maximum value may particularly be, for example, 100%) is represented by Ltmax. Further, the light transmission factor (numerical aperture) of the pixels for obtaining a display luminance y0 of the pixel of the display area units when the light source units which compose the backlight have the maximum luminance Ymax is represented by Lt0. In this instance, the light source units which compose the backlight area controlled so that the display luminance y0 thereof may satisfy.

$$Y0 \cdot Lt\max = Y\max \cdot Lt0$$

It is to be noted that a concept of such control is illustrated in FIGS. 10A and 10B. Here, the display luminance y0 of the light source units is varied for each frame (hereinafter referred as image display frame for the convenience of description) in image display of the liquid crystal display apparatus.

An input signal which is inputted from the outside and corresponds to a maximum value from among a plurality of control signals to be supplied to a plurality of pixels which form a display area unit is hereinafter referred to as display area unit internal maximum input signal (whose value is $x_{U-max}$). Then, it is assumed that the value $x_{U-max}$ of a certain display area unit (called (A+1)th display area unit for the convenience of description is a high value xH while the value xU-max of display area unit internal maximum input signals for display area units (called Ath display area unit and (A+2)th display area unit for the convenience of description) adjacent (contiguous) to the (A+1)th display area unit are low values XL. In other words, the light source luminance of the (A+1)th light source unit corresponding to the (A+1)th display area unit has a high value YH while the light source luminance of the Ath and (A+2)th source units has a low value YL. The state of the input signal for controlling the light transmission factor (numerical aperture) of the pixels which form such a display area unit as described above is schematically illustrated in FIG. 11A while the state of the light source luminance is schematically illustrated in FIG. 11B.

Incidentally, the light transmission factor of a liquid crystal cell may not usually be reduced fully to "0". Accordingly, even if the input signal is set to the lowest value, the light transmission factor (numerical aperture) of each pixel or each sub-pixel does not exhibit the lowest value, but light leaks from the liquid crystal cells. Here, it is assumed that, while, in the (A+1)th display area unit, the input signal corresponding to a control signal to a certain pixel is the value xU-max and has the high value xH, a control signal corresponding to an input signal of the low value xL is supplied to the other pixels which form the (A+1)th display area unit. Further, it is assumed that a control signal corresponding to an input signal of the low value xL is supplied to all pixels which compose the Ath and (A+2)th display area units (refer to FIG. 11A). In such an instance, as seen from the display luminance schematically illustrated in FIG. 11C, although a control signal corresponding to an input signal of the low value xL is supplied to the other pixels which compose the (A+1)th display area unit, the display luminance at the portion becomes higher than a desired display luminance (represented by a value yyL in FIG. 11C. As a result, although the input signal has the same value xL, the luminance value yyL becomes difference from the display luminance (indicated by a value yL in FIG. 11C) of the pixels which compose the Ath and (A+2)th display area units. If such a phenomenon as just described appears, then the black displaying portion is observed as if it were afloat. Thus, a uniform low display luminance state may not be obtained, resulting in deterioration of the quality of the image display.

Therefore, it is desirable to provide a display apparatus and a driving method for a display apparatus by which, where a bright image display portion exists in the proximity of a stretched dark image display portion, the display luminance state of the dark image display portion is uniformized as far as possible.

According to an embodiment of the present invention, there is provided a display apparatus including a display section, a backlight, and a drive section. The display section is formed from a liquid crystal display apparatus of the transmission type having a display area formed from pixels arranged in a matrix. The backlight is formed from a plurality of light source units disposed individually corresponding to a plurality of display area units which form the display area and configured to illuminate the back side of the display section. The drive section is configured to drive the display section and the backlight based on input signals from the outside. The drive section includes a control section configured to control a light emitting state of the light source unit corresponding to each of the display area units based on a display area unit internal maximum input signal which indicates a maximum value from among the input signals corresponding to the display area unit. The control section is operable to check whether or not there exists, around a low luminance light emitting display area unit wherein the value of the display area unit internal maximum input signal is lower than a first prescribed value, a high luminance light emitting display area unit whose display area unit internal maximum input signal has a value equal to or higher than a second prescribed value which is higher than the first prescribed value and perform a process of increasing, where such a high luminance light emitting display area unit exists around the low luminance light emitting display area unit, the luminance of the light source unit corresponding to the low luminance light emitting display area unit.

According to another embodiment of the present invention, there is provided a driving method for a display apparatus which includes a display section, a backlight, and a drive section. The display section is formed from a liquid crystal display apparatus of the transmission type having a display area formed from pixels arranged in a matrix. The backlight is formed from a plurality of light source units disposed individually corresponding to a plurality of display area units which form the display area and configured to illuminate the back side of the display section. The drive section is configured to drive the display section and the backlight based on input signals from the outside. The drive section includes a control section configured to control a light emitting state of the light source unit corresponding to each of the display units based on a display area unit internal maximum input signal which indicates a maximum value from among the input signals corresponding to the display area unit. The control section performs the steps of checking whether or not there exists, around a low luminance light emitting display area unit wherein the value of the display area unit internal maximum input signal is lower than a first prescribed value, a high luminance light emitting display area unit whose display area unit internal maximum input signal has a value equal to or higher than a second prescribed value which is higher than the first prescribed value, and performing a process of increasing, where such a high luminance light emitting display area unit exists around the low luminance light emitting display area unit, the luminance of the light source unit corresponding to the low luminance light emitting display area unit.

In the display apparatus and the driving method for a display apparatus, where a low luminance light emitting display area unit satisfies the particular condition and besides the positional relationship between the low luminance light emitting display area unit and a high luminance light emitting display area unit satisfies the predetermined relationship, the process of increasing the luminance of the light source unit corresponding to the low luminance light emitting display area unit is performed. Accordingly, also when a bright image display portion exists in the proximity of an area over which a dark image display portion or portions extend, the display luminance state of the dark image display portion or portions can be uniformized as far as possible. Thus, appearance of such a problem that the quality of image display is deteriorated in that a black display portion is partially observed as if it were afloat and a uniform low display luminance state is not obtained can be prevented with certainty.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3 is a flow chart illustrating the driving method for a display apparatus according to the working example 1;

DETAILED DESCRIPTION OF THE PREFERRED EMBODIMENTS

Outline of Embodiments

Figure 1A:
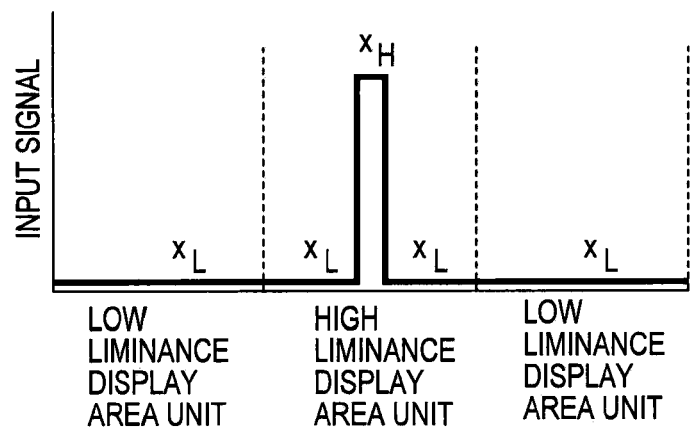
FIGS. 1A to 1D are diagrammatic views illustrating a state of the light transmission factor (numerical aperture), a state of the light source luminance and a state of the display luminance at pixels which compose display area units, respectively, and illustrating a driving method for a display apparatus according to a working example 1 or a working example 2.

An outline of embodiments of the present invention is described below.

Display apparatus according to first to third working examples which make an example of an embodiment of the present invention and display apparatus in driving methods for a display apparatus according to first to third working examples which make an example of an embodiment of the present invention includes:

a display section formed from a liquid crystal display apparatus of the transmission type having a display area formed from pixels arranged in a matrix;

a backlight formed from a plurality of light source units disposed individually corresponding to a plurality of display area units which form the display area and configured to illuminate the back side of the display section; and a drive section configured to drive the display section and the backlight based on input signals from the outside. The drive section includes a control section configured to control a light emitting state of the light source unit corresponding to each of the display area units based on a display area unit internal maximum input signal which indicates a maximum value from among the input signals corresponding to the display area unit.

It is to be noted that, in the following description, a plurality of display area units (which area somewhat virtual ones) are sometimes referred to as P×Q display area units, and in this instance, the number of light source units is P×Q. Further, the value of a display area unit internal maximum input signal among input signals corresponding to one display area unit (the number of input signals is equal to the number of pixels which compose the display area unit or is equal to the number sub-pixels which compose the display area unit) is sometimes represented as "$x_{U\text{-}max}$". Furthermore, the highest value among the value $x_{U\text{-}max}$ of the display area unit internal maximum input signals (the number of display area unit internal maximum input signals is P×Q) is sometimes represented as "xMAX".

Further, a display area unit whose display area unit internal maximum input signal has a value ($x_{U\text{-}max}$) lower than a first prescribed value (PD1) is referred to as "low luminance light emitting display area unit". Meanwhile, a display area unit whose display area unit internal maximum input signal has a value ($x_{U\text{-}max}$) equal to or hither than a second prescribed value which is higher than the first prescribed value (PD1) (PD2>PD1) is referred to as "high luminance light emitting display area unit". Further, where the liquid crystal display apparatus is a color liquid crystal display apparatus, one pixel is composed typically of three sub-pixels including a red light emitting sub-pixel, a green light emitting sub-pixel and a blue light emitting sub-pixel. Accordingly, also the input signals area set of three input signals including an input signal for a red light emitting sub-pixel, another input signal for a green light emitting sub-pixel and a further input signal for a blue light emitting sub-pixel. In this instance, the value ($x_{U\text{-}max}$) of the display area unit internal maximum input signal indicates the highest value from among the value of a maximum input signal for a red light emitting sub-pixel, the value of a maximum input signal for a green light emitting sub-pixel and the value of a maximum input signal for a blue light emitting sub-pixel.

In the display apparatus according to the first working example which is an example of embodiments of the present invention, the control section checks whether or not there exists, around a low luminance light emitting display area unit wherein the value of the display area unit internal maximum input signal is lower than a first prescribed value, a high luminance light emitting display area unit whose display area unit internal maximum input signal has a value equal to or higher than a second prescribed value which is higher than the first prescribed value, and performs a process of increasing, where such a high luminance light emitting display area unit exists around the low luminance light emitting display area unit, the luminance of the light source unit corresponding to the low luminance light emitting display area unit.

In the driving method for a display apparatus according to the first working example of the embodiment of the present invention, the control section performs the steps of:

checking whether or not there exists, around a low luminance light emitting display area unit wherein the value of the display area unit internal maximum input signal is lower than a first prescribed value, a high luminance light emitting display area unit whose display area unit internal maximum input signal has a value equal to the higher than a second prescribed value which is higher than the first prescribed value; and increasing, where such a high luminance light emitting display area unit exists around the low luminance light emitting display area unit, the luminance of the light source unit corresponding to the low luminance light emitting display area unit.

Preferably, the control section checks whether or not there exists a low luminance light emitting display area unit and besides checks whether or not a high luminance light emitting display area unit exists around the low luminance light emitting display area unit to perform the process described above.

In the display apparatus according to the second working example of the embodiment of the present invention, the control section determines a ratio (RT1) of the low luminance light emitting display area units to all of the display area units. Also, the control section checks whether or not a high luminance light emitting display area unit exists around any of the low luminance light emitting display area units. Further, the control section performs, where the ratio (RT1) of the low luminance light emitting display area units is equal to or higher than a predetermined value (RT0) and a high luminance light emitting display area unit exists around any of the low luminance light emitting display area units, a process of increasing the luminance of the light source unit corresponding to the low luminance light emitting display area unit.

In the driving method for a display apparatus according to the second working example, the control section further performs the steps of:

determining a ratio (RT1) of the low luminance light emitting display area units to all of the display area units;

checking whether or not a high luminance light emitting display area unit exists around any of the low luminance light emitting display area units; and performing, where the ratio (RT1) of the low luminance light emitting display area units is equal to or higher than a predetermined value (RT0) and a high luminance light emitting display area unit exists around any of the low luminance light emitting display area units, a process of increasing the luminance of the light source unit corresponding to the low luminance light emitting display area unit.

Further, in the display apparatus according to the third working example of the embodiment of the present invention, the control section determines a ratio (RT1) of the low luminance light emitting display area units to all of the display area units. The control section checks whether or not a high luminance light emitting display area unit exists around any of the low luminance light emitting display area units. Also, the control section performs, where the ratio (RT1) of the low luminance light emitting display area units is equal to or higher than a predetermined value (RT0) and the high luminance light emitting display area unit exists adjacent a plurality of successive low luminance light emitting display area units, a process of increasing the luminance of the light source unit by a greater amount as the low luminance light emitting display area unit which corresponds to the light source unit is positioned nearer to the high luminance light emitting display area unit.

Further, in the driving method for a display apparatus according to the third working example of the embodiment of the present invention, the control section further performs the steps of:

determining a ratio (RT1) of the low luminance light emitting display area units to all of the display area units;

checking whether or not a high luminance light emitting display area unit exists adjacent a plurality of successive low luminance light emitting display area units; and performing, where the ratio (RT1) of the low luminance light emitting display area units is equal to or higher than a predetermined value (RT0) and a high luminance light emitting display area unit exists adjacent a plurality of successive low luminance light emitting display area units, a process of increasing the luminance of the light source unit by a greater amount as the low luminance light emitting display area unit which corresponds to the light source unit is positioned nearer to the high luminance light emitting display area unit.

Generally, the light transmission factor (numerical aperture) of a pixel (or each sub-pixel) before correction based on a γ (gamma) characteristic can be represented by a linear function of an input signal x where the input signal x exceeds a certain value xth. However, where the input signal x is equal to or lower than the certain value xth, the ratio of reduction of the light transmission factor (numerical aperture) is lower than the ratio of reduction of the input signal x. In particular, where the input signal x is equal to or lower than the certain value xth, the light transmission factor (numerical aperture) is displaced from the linear function of the input signal x. In the display apparatus or the driving methods for a display apparatus according to the first to third working examples of the embodiment of the present invention, the first prescribed value (PD1) may be, for example, a value obtained by normalization of the certain value xth. Or more specifically, the first prescribed value (PD1) may be set equal to or lower than 25% of the maximum value $x_{in-max}$ of the input signal, preferably equal to or lower than 15%. Here, the maximum value xIn-max of the input signal is a value corresponding, for example, where 8-bit control is used for the graduation control, to "255" while the graduation control is performed among $2^8$ different stages from 0 to 255.

In the display apparatus or the driving methods for a display apparatus according to the first to third working examples of the embodiment of the present invention which includes the preferred configuration described above, the second prescribed value (PD2) may be higher than 25% the maximum value xMAX among the value xU-max of the display area unit internal maximum input signal.

In the display apparatus or the driving methods for a display apparatus according to the second to third working examples of the embodiment of the present invention which include the various working examples and configurations described above, the predetermined value (RT0) depends upon the characteristic of the light source. In particular, where the light source used has small expanse of light, even when the expanse (area) of a low luminance portion is small, a black display portion is observed as if it were afloat, and therefore, it is necessary to set the predetermined value (RT0) to a low value. On the other hand, where the light source used has a great expanse of light and can brightly illuminate up to a remote place, even when the expanse (area) of a low luminance portion is large, a black display portion is less likely to be observed as if it were afloat. Therefore, the predetermined value (RT0) can be set to a high value. Accordingly, the predetermined value (RT0) should be determined by investigating a relationship between the expanse (area) of a low luminance portion and a phenomenon that a black display portion is observed as if it were afloat through various tests conducted actually.

The light transmission factor (also called numerical aperture) Lt of a pixel or a sub-pixel, the luminance (display luminance) y of a portion of a display area unit which corresponds to a pixel or a sub-pixel and the luminance (light source luminance) Y of a light source unit are defined as given below.

$Y_1$: for example, a maximum luminance of light source luminance, hereinafter referred to sometimes as light source luminance first prescribed value Lt1: for example, a maximum value of the light transmission factor (numerical aperture) of a pixel or a sub-pixel in a display area unit, hereinafter referred to sometimes as light transmission factor first prescribed value Lt2: a light transmission factor (numerical aperture) of a pixel or a sub-pixel when it is assumed that, when the light source luminance is the light source luminance first prescribed value Y1, a control signal corresponding to a display area unit internal maximum input signal (whose value is $x_{U-max}$) is supplied to a pixel or a sub-pixel, hereinafter referred to sometimes as light transmission factor second prescribed value, where $0 \leq Lt2 \leq Lt1$ y2: display luminance which is obtained when it is assumed that the light source luminance is the light source luminance first prescribed value $Y_1$ and the light transmission factor (numerical aperture) of a pixel or a sub-pixel is the light transmission factor second prescribed value Lt2, hereinafter referred to sometimes as display luminance second prescribed value Y2: light source luminance of a light source unit for making the luminance of a pixel or a sub-pixel equal to the display luminance second prescribed value $y_2$ when it is assumed that a control signal corresponding to the display area unit internal maximum input signal $x_{U-max}$ is supplied to the pixel or sub-pixel and besides the light transmission factor (numerical aperture) of the pixel or sub-pixel at this time is corrected to the light transmission factor first prescribed value Lt1. However, the light source luminance $Y_2$ is sometimes subject to correction taking an influence of the light source luminance of each light source unit on the light source luminance of the other light source units into consideration.

In the display apparatus of the driving method for a display apparatus according to the first working example of the embodiment of the present invention, it is checked by the control section whether or not a low luminance light emitting display area unit exists. In this instance, if at least one such low luminance light emitting display area unit as just described exists, then the control section decides that a low luminance light emitting display area unit exists. Further, it is checked by the control section whether or not a high luminance light emitting display area unit exists around a low luminance light emitting display area unit. Here, the term "around" in "around a low luminance light emitting display area unit" signifies a state wherein a high luminance light emitting display area unit is positioned contiguously to a low luminance light emitting display area unit or a low luminance light emitting display area unit is positioned contiguously to an end of R (integer equal to or greater than two) successive low luminance light emitting display area units or else R' (integer equal to or greater than one) display area unit or units (called intermediate display area unit or units for the convenience of description) exist between low luminance light emitting display area unit and a high luminance light emitting display area unit. An intermediate display area unit in this instance is a display area unit whose display area unit internal maximum input signal has a value $x_{U-max}$ higher than the first prescribed value PD1 but lower than the second prescribed value PD2.

Further, in the display apparatus or the driving method for a display apparatus according to the first working example of the embodiment of the present invention, when a high luminance light emitting display area unit exists around a low luminance light emitting display area unit, a process of increasing the luminance of the light source unit corresponding to the low luminance light emitting display area unit is performed. More particularly, for example, the following process if performed. In particular, the process if performed such that, when it is assumed that a control signal corresponding to the display area unit internal maximum input signal (whose value $x_{U-max}$ is higher than the maximum value xMAX) is supplied to a pixel or a sub-pixel and besides the light transmission factor (numerical aperture) of the pixel or sub-pixel at this time is corrected to the light transmission factor first prescribed value Lt1, light source for making the luminance of the pixel or sub-pixel equal to the display luminance second prescribed value $y_2$ is obtained. This process may be performed for the light source units corresponding to all low luminance light emitting display area units. Further, such a process that, when it is assumed that a control signal corresponding to the display area unit internal maximum input signal (whose value is $x_{U-max}$) is supplied to a pixel or a sub-pixel and besides the light transmission factor (numerical aperture) of the pixel or sub-pixel at this time is corrected to the light transmission factor first prescribed value Lt1, the light source luminance becomes equal to the value $Y_2'$ described hereinabove may be performed for all of those light source units whose light source luminance for making the luminance of a pixel or a sub-pixel equal to the display luminance second prescribed value $y_2$ does not reach the light source luminance Y2'. Further, in the other light source units, such a process may be performed that, when it is assumed that a control signal corresponding to the display area unit internal maximum input signal (whose value is $x_{U-max}$) is supplied to a pixel or a sub-pixel and besides the light transmission factor (numerical aperture) of the pixel or sub-pixel at this time is corrected to the light transmission factor first prescribed value Lt1, the light source luminance $Y_2$ of the light source unit for making the luminance of the pixel or sub-pixel equal to the display luminance second prescribed value y2 is obtained.

In the display apparatus or the driving method for a display apparatus according to the second working example of the embodiment of the present invention, it is checked by the control section whether or not a high luminance light emitting display area unit exists around a low luminance light emitting display area unit. Here, the term "around" in "around a low luminance light emitting display area unit" signifies a state wherein a high luminance light emitting display area unit is positioned contiguously to a low luminance light emitting display area unit or a low luminance light emitting display area unit is positioned contiguously to an end of R (integer equal to or greater than two) successive low luminance light emitting display area units or else R' (integer equal to or greater than one) intermediate display area unit or units exist between low luminance light emitting display area unit and a high luminance light emitting display area unit. Further, where the ratio (RT1) of low luminance light emitting display area units is equal to or higher than the predetermined value (RT0) and besides a high luminance light emitting display area unit exists around any of the low luminance light emitting display area units, a process of increasing the luminance of the light source unit corresponding to the low luminance light emitting display area unit is performed. More particularly, a process similar to that described hereinabove, in connection with the first working example of the embodiment of the present invention may be performed. It is to be noted that, in the display apparatus or the driving method for a display apparatus according to the second working example of the embodiment of the present invention, since the process of increasing the luminance of the light source unit corresponding to each low luminance light emitting display area unit is performed where the ratio (RT1) of the determined low luminance light emitting display area units to all of the low luminance light emitting display area units is equal to or higher than the predetermined value (RT0), more natural image display can be achieved.

In the display apparatus or the driving method for a display apparatus according to the third working example of the embodiment of the present invention, a process of increasing the luminance such that the luminance is increased by a greater amount for the light source unit corresponding to that of the low luminance light emitting display area units which is nearer to the high luminance light emitting display area unit is performed by the control section. More particularly, where R (integer equal to or higher than two) successive low luminance light emitting display area units with reference to a high luminance light emitting display area unit are represented as a first low luminance light emitting display area unit, a second low luminance light emitting display area unit, ..., an (R-1)th low luminance light emitting display area unit and an Rth low luminance light emitting display area unit, when it is assumed that, in the light source unit corresponding to the rth (r=1, 2, ..., R) low luminance light emitting display area unit, a control signal corresponding to a display area unit internal maximum input signal (whose value is $x''_{U-max}(r)$) is supplied to a pixel or a sub-pixel and besides the light transmission factor (numerical aperture) of the pixel or sub-pixel at this time is corrected to the light transmission factor first prescribed value Lt1, such a process that light source luminance (sometimes represented by $Y_2(r)''$) of the light source unit for making the luminance of the pixel or sub-pixel equal to the display luminance second prescribed value $y_2$ is obtained is performed. Here, the value $x''_{U-max}(r)$ of the display area unit internal maximum input signal should satisfy $$x''_{U-max}(r) = \beta1^r \cdot xMAX \text{ (where } 0<\beta1<1)$$

or $$x''_{U-max}(r) = (1-\beta2 \cdot r)xMAX$$

It is to be noted that, in the display apparatus or the driving method for a display apparatus according to the third working example of the embodiment of the present invention, the process of increasing the luminance of the light source corresponding to any of the low luminance light emitting display area units stepwise is performed where the ratio (RT1) of the determined low luminance light emitting display area units to all of the display area units is equal to or higher than the predetermined value (RT0). Therefore, further natural image display can be achieved.

In the display apparatus or the driving method for a display apparatus according to the first working example of the embodiment of the present invention, if a high luminance light emitting display area unit does not exists around a low luminance light emitting display area unit, for example, the process below is executed for all of the light units. Also when, in the display apparatus or the driving method for a display apparatus according to the second working example of the embodiment of the present invention, the ratio (RT1) of the low luminance light emitting display area units is lower than the predetermined value (RT0) or a high luminance light emitting display area unit does not exist around a low luminance light emitting display area unit, for example, the process described below is performed for all of the light source units. Furthermore, also when, in the display apparatus or the driving method for a display apparatus according to the third working example of the embodiment of the present invention, the ratio (RT1) of the low luminance light emitting display area units is lower than the predetermined value (RT0) or a high luminance light emitting display area unit does not exist around a low luminance light emitting display area unit or else a plurality of low luminance light emitting display area units are not positioned adjacent each other, for example, the process described below is performed for all of the light source units. In particular, when it is assumed that a control signal corresponding to the display area unit internal maximum input, signal (whose value is $x_{U-max}$) is supplied to a pixel or a sub-pixel and besides the light transmission factor (numerical aperture) of the pixel or sub-pixel at this time is corrected to the light transmission factor first prescribed value Lt1, a process by which the light source luminance Y2 of the light source unit for making the luminance of the pixel or sub-pixel equal to the display luminance second prescribed value y2 is obtained is performed.

In the display apparatus or the driving methods for a display apparatus according to the first to third working examples of the embodiment of the present invention which includes the preferred working examples and configurations described above, one light source unit is surrounded by four light source units or by three light source units and a side wall of a housing (hereinafter described) or else by two light sources and two side walls of the housing. Where a high luminance light emitting display area unit exists around a low luminance light emitting display area unit or is positioned adjacent a low luminance light emitting display area unit, the high luminance light emitting display area unit may exist or may be adjacent the low luminance light emitting display area unit in at least one of all eight (vertical), horizontal and oblique) directions with reference to the low luminance light emitting display area unit.

In the display apparatus or the driving method for a display apparatus according to the embodiment of the present invention, a light emitting diode (LED) may be used as the light source of the light source units which compose the backlight. Or alternatively, a fluorescent lamp of the cold cathode type, an electroluminescence (EL) device, a cold cathode field electron emission device (FED), a plasma display device or an ordinary lamp may be used. Were a light emitting diode is used for the light source, a red light emitting diode which emits red light having a wavelength typically of 640 nm, a green light emitting diode which emits green light of a wavelength typically of 530 nm and a blue light emitting diode which emits blue light of a wavelength typically of 450 nm may be used as a set of light emitting diodes to obtain white light. Alternatively, a white light emitting diode (for example, a white light emitting diode wherein an ultraviolet or blue light emitting diode and particles of a fluorescent material are combined so that white light obtained. The light source may include an additional light emitting diode or diodes from which fourth color light, fifth color light, . . . other than red, green and blue light may be emitted.

Further, where a light emitting diode is used for the light source, a plurality of light emitting diodes which emit red light, a plurality of green light emitting diodes which emit green light and a plurality of blue light emitting diodes which emit blue light are arranged in the housing. More particularly, the light source can be formed from a light emitting diode unit which may be one of combinations of (one red light emitting diode, one green light emitting diode and one blue light emitting diode), (one red light emitting diode, two green light emitting diodes and one blue light emitting diode), (two red light emitting diodes, two green light emitting diodes, and one blue light emitting diode) and so forth. One light source unit includes at least one light emitting diode unit.

The light emitting diodes may have a face-up structure or a flip-chip structure. In particular, a light emitting includes a substrate and a light emitting layer formed on the substrate and may be structured such that light is emitted from the light emitting layer or light from the light emitting layer passes through the substrate and is emitted to the outside. More particularly, a light emitting diode (LED) has a layered structure of, for example, a first clad layer formed on a substrate and formed from a compound semiconductor layer having a first conduction type (for example, the n type), an active layer formed on the first clad layer, and a second clad layer formed on the active layer and formed from another compound semiconductor layer having a second conduction type (for example, the p type). Further, the light emitting diode has a first electrode electrically connected to the first clad layer, and a second electrode electrically connected to the second clad layer. The layer which forms the light emitting diode may be formed from a well-known one of compound semiconductor materials relaying upon the wavelength of light to be emitted.

In the embodiment of the present invention, preferably an optical sensor for measuring a light emission state of the light source (in particular, for example, the luminance of the light source, the chromaticity of the light source, or the luminance and chromaticity of the light source) is arranged. The number of such optical sensors may be at least one. However, it is preferable from a point of view of assured measurement of the light emission state of each light source unit to adopt a configuration that a set of optical sensors are disposed for a light source unit. The optical sensor may be, for example, a well-known photodiode or CCD device. Where the light source is formed, for example, as a set of a red light emitting diode, a green light emitting diode and a blue light emitting diode, the light emission state of the light source to be measured by the optical sensor is the luminance and the chromaticity of the light source. Further, in this instance, one set of optical sensors can be composed of a photodiode having a red filter attached thereto for measuring the light intensity of red light, another photodiode having a green filter attached thereto for measuring the light intensity of green light and a further photodiode having a blue filter attached thereto for measuring the light intensity of blue light.

The drive section including the control section may include a control circuit (backlight control circuit) and light source unit drive circuit as a control section) composed of, for example, a pulse width modulation (PWM) signal generation circuit, a duty ratio control circuit, a light emitting diode (LED) drive circuit, an arithmetic operation circuit, a storage device (memory) and so forth, and a liquid crystal display apparatus drive circuit formed from a well-known circuit such as timing controller.

The backlight may further include an optical function sheet group including a diffusion plate, a diffusion sheet, a prism sheet and a polarization conversion sheet, and a reflecting sheet.

Control of the luminance of a pixel (display luminance) and the luminance of a light source unit (light source luminance) is performed for each one image display frame. It is to be noted that the number of pieces of image information sent as an electric signal to the drive section for one second (images per one second) is the frame frequently (frame rate), and the reciprocal number to the frame frequency is the frame time (unit: second).

A liquid crystal apparatus of the transmission type includes, for example, a front panel including a transparent first electrode, a rear panel including a transparent second electrode, and liquid crystal material interposed between the front panel and the rear panel.

The front panel is typically composed of a first substrate formed from a glass substrate or a silicon substrate, a transparent first electrode (also called common electrode and typically made of ITO) provided on the inner face of the first substrate, and a polarizing film provided on the outer face of the first substrate. Further, in the case of a color liquid crystal display apparatus of the transmission type, a color filter coated with an overcoat layer made of acrylic resin or epoxy resin is provided on the inner face of the first substrate. The arrangement pattern of the color filter may be any of delta arrangement, stripe arrangement, diagonal arrangement or rectangle arrangement. The front panel is further configured such that a transparent first electrode is formed on the overcoat layer. It is to be noted that an orientation film is formed on the transparent first electrode. Meanwhile, the rear panel is typically composed of a second substrate formed from a glass substrate or a silicon substrate, a switching element formed on the inner face of the second substrate, a transparent second electrode (also called pixel electrode and typically made of ITO) which is controlled between conduction and non-conduction by the switching element, and a polarizing film provided on the outer face of the second substrate. An orientation film is formed on the entire face including the transparent electrode. Such various members and liquid crystal material from which a liquid crystal display apparatus including a color liquid crystal display apparatus of the transmission type as described above can be formed from well-known members and materials. The switching element may be a three-terminal element such as a MOS FET or a thin film transistor (TFT) or a two-terminal element such as a MIN element, a barrister element or a diode formed on a single crystalline silicon semiconductor substrate.

An area over which the transparent first electrode and the transparent second electrode overlap with each other and which includes the liquid crystal cell corresponds to one pixel or one sub-pixel. In a color liquid crystal display apparatus of the transmission type, a red light emitting sub-pixel (sub-pixel [R]) which forms each pixel is formed from a combination of such an area as mentioned above and a color filter which passes red light therethrough. Meanwhile, a green light emitting sub-pixel (sub-pixel [G]) is formed from a combination of such an area as described above and a color filter which passes green light therethrough, and a blue light emitting sub-pixel (sub-pixel) [B]) is formed from a combination of such an area as described above and a color filter which passes blue light therethrough. The arrangement pattern of sub-pixels [R], [G] and [B] coincides with the arrangement pattern of the color filters. It is to be noted that the configuration of a pixel is not limited to that which is composed of a set of three sub-pixels including a red light emitting sub-pixel, a green light emitting sub-pixel and a blue light emitting sub-pixel, but a pixel may be formed from one or a plurality of sub-pixels in addition to such three sub-pixels as mentioned above. For example, a pixel may be composed of a set of sub-pixels which additionally includes a sub-pixel which emits white light for the enhancement of the luminance, another set which additionally includes sub-pixels for emitting light of complementary colors for expanding the color reproduction range, a further set which additionally includes a sub-pixel for emitting yellow light for expanding the color reproduction range or a still further set which additionally includes sub-pixels for emitting yellow and cyan colors for expanding the color reproduction range.

Where the number N0×N0 of pixels arranged in a matrix is represented by M0, N0), several image displaying resolutions such as VGA (640, 480), S-VGA (800, 600), XGA (1,024, 768), APRC (1,152, 900), S-XGA (1,280, 1,024), U-XGA (1,600, 1,200), HD-TV (1,920, 1080), Q-XGA (2,048, 1,636), (1,920, 1,035), (720, 480) and (1,280, 960) may be applied particularly as the values of (M0N0). However, the number (M0, N0) is not limited to them. Further, although the relationship between the value of (M0, N0) and the value of (P, Q) is not limited particularly, it may be any of such relationships as appearing in Table 1 given below. The number of pixels which compose one display area unit may be 20×20 to 320×240, preferably 50×50 to 200×200. The number of pixels in a display area unit may be fixed or may vary.

TABLE 1

|  | Number of P | Number of Q |
| --- | --- | --- |
| VGA (640, 480) | 2-32 | 2-24 |
| S-VGA (800, 600) | 3-40 | 2-30 |
| XGA (1024, 768) | 4-50 | 3-39 |
| APRC (1152, 900) | 4-58 | 3-45 |
| S-XGA (1280, 1024) | 4-64 | 4-51 |
| U-XGA (1600, 1200) | 6-80 | 4-60 |
| HD-TV (1920, 1080) | 6-86 | 4-54 |
| Q-XGA (2048, 1536) | 7-102 | 5-77 |
| (1920, 1035) | 7-64 | 4-52 |
| (720, 480) | 3-34 | 2-24 |
| (1280, 960) | 4-64 | 3-48 |

In the display apparatus or the driving method for a display apparatus according to the first working example of the present invention, when a low luminance light emitting display area unit satisfies a particular condition and besides the positional relationship between the low luminance light emitting display area unit and a high luminance light emitting display area unit satisfies a predetermined relationship, a process of increasing the luminance of the light source unit which corresponds to the low luminance light emitting display area unit is performed. Accordingly, the display luminance state of a dark image display portion can be uniformized as far as possible. Therefore, appearance of such a problem that the quality of image display is deteriorated in that a uniform low display luminance state is not obtained can be prevented with certainty.

Further, since the luminance of a light source which forms a light source unit corresponding to a display area unit is controlled by the drive section so that the luminance of a pixel when it is assumed that a control signal corresponding to an input signal having the value $x_{U-max}$ of the display area unit internal maximum input signal is supplied to the pixel (that is, the display luminance second prescribed value $y_2$ at the light transmission factor first prescribed value Lt1) may be obtained, not only reduction of the power consumption of the backlight can be achieved, but also increase of the white level and drop of the black level can be achieved thereby to obtain a high contrast ratio (luminance ratio between a fully black display portion and a fully white display portion on the surface of the screen of the liquid crystal display apparatus which does not include external light reflection or the like). Consequently, the brightness of a desired display area can be emphasized, and therefore, enhancement of the quality of image display can be anticipated.

Outline of the Display Section and the Backlight

Before a display apparatus of a preferred embodiment of the present invention is described in connection with working examples of the present invention with reference to the accompanying drawings, an outline of a display section formed from a color liquid crystal display apparatus of the transmission type and a backlight and suitable for use with the working examples is described with reference to FIGS. 4, 5, 6A, 6B and 7.

Figure 4:
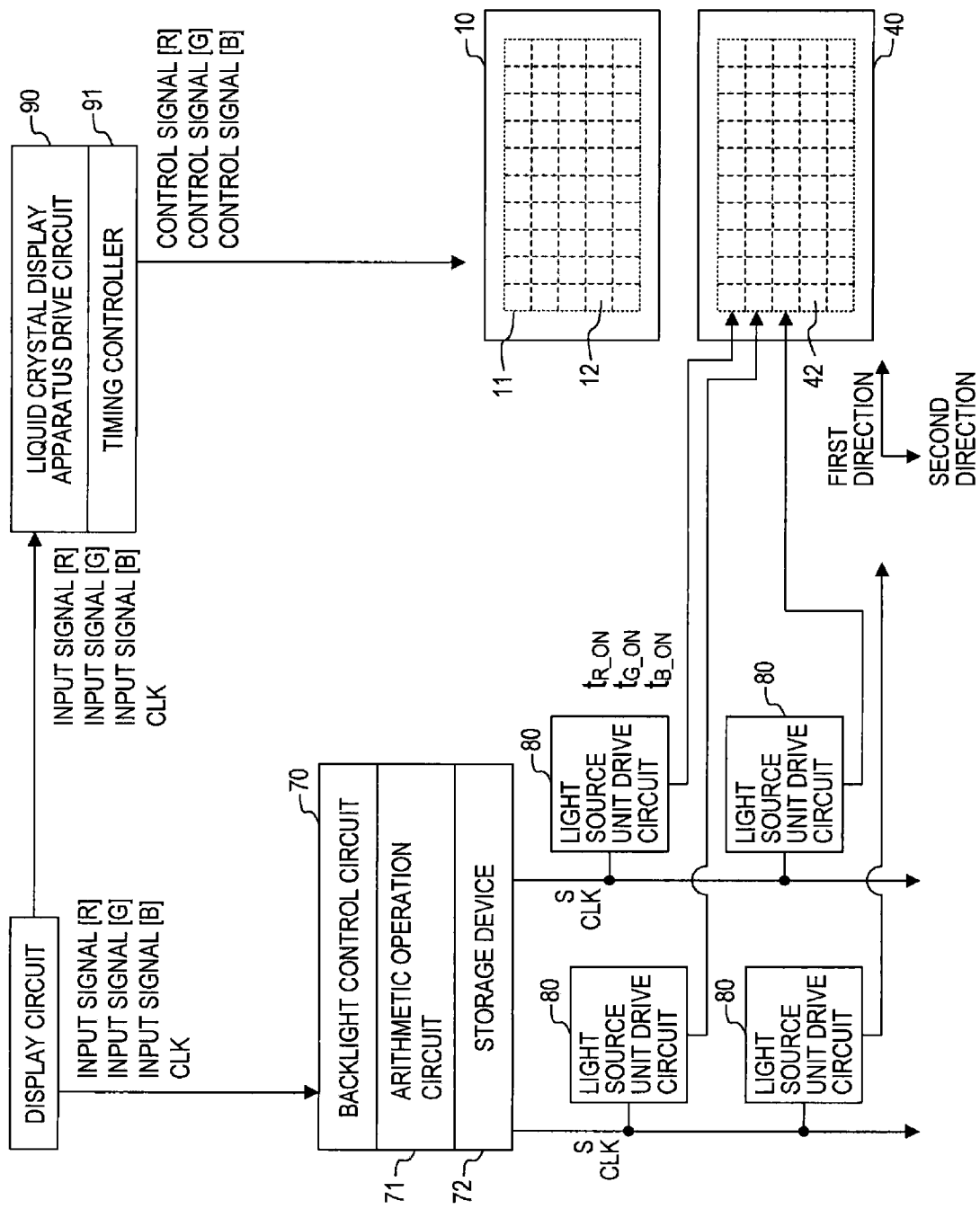
FIG. 4 is a flow diagram illustrating a concept of a display apparatus which is composed of a color liquid crystal display apparatus and a backlight and is suitable for use with the working examples.

Referring first to FIG. 4, the color liquid crystal display apparatus 10 of the transmission type which corresponds to a display section has a display area 11 in which total M0×N0 pixels are arranged in a matrix wherein M0 pixels are arranged in a first direction and N0 pixels are arranged in a second direction. It is assumed here that the display area 11 is divided into P×Q virtual display area units 12. Each of the display area units 12 includes a plurality of pixels. In particular, where the image display resolution of the display area 11 satisfies, for example, the HD-TV standards and the number M0×N0 of pixels arranged in a matrix is represented by (M0, N0), the number M0×N0 is, for example, (1,920, 1,080). Further, the display area 11 (indicated by alternate long an short dashes lines in FIG. 4) composed of pixels arranged in a matrix is divided in P×Q virtual display area units 12 (boundaries are indicated by broken lines). It is to be noted that, for the simplification of illustration, the number of display area units 12 (and light source units 42 hereinafter described) in FIG. 4 is different from the value given above. Each of the display area units 12 includes a plurality of (M×N) pixels, and the number of pixels which compose one display area unit 12 is, for example, approximately 10,000. Each pixel is composed of a plurality of sub-pixels set in advance which emit light of colors different from one another. More particularly, each pixel is composed of three sub-pixels including a red light emitting sub-pixel (sub-pixel [R]), a green light emitting sub-pixel (sub-pixel [G]) and a blue light emitting sub-pixel (sub-pixel [B]). The color liquid crystal display apparatus 10 is driven line-sequentially. More particularly, the color liquid crystal display apparatus 10 includes scanning electrodes (extending along the first direction) and data electrodes (extending along the second direction) which cross with each other in a matrix. A scanning signal is inputted to the scanning electrodes to select and scan the scanning electrodes while a data signal (based on a control signal) is inputted to the data electrodes so as to display an image to form one screen.

Figure 7:
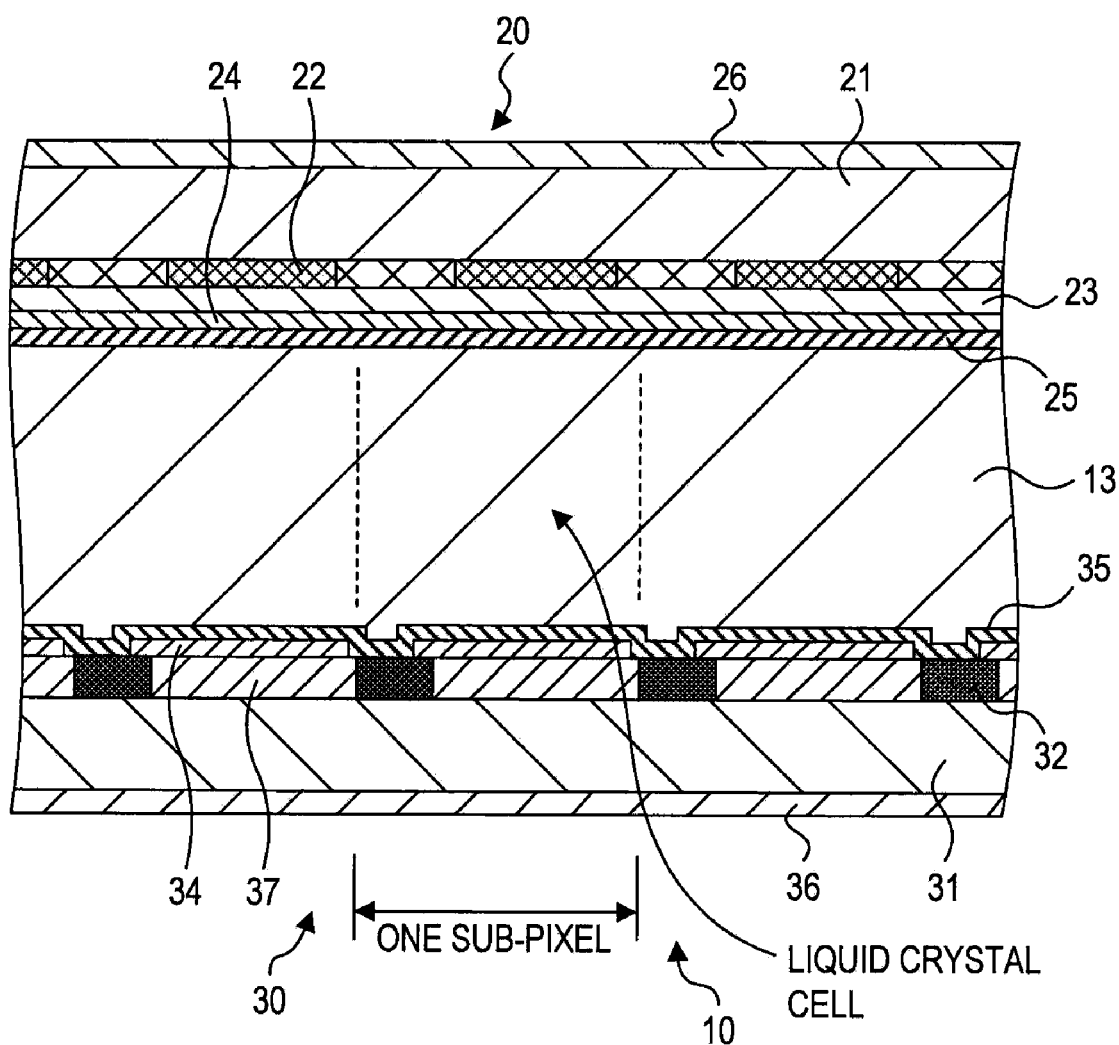
FIG. 7 is a schematic partial sectional view of the color liquid crystal display apparatus.

A schematic partial sectional view of the color liquid crystal display apparatus 10 is shown in FIG. 7. Referring to FIG. 7, the color liquid crystal display apparatus 10 includes a front panel 20 having transparent first electrodes 24, a rear panel 30 having transparent second electrodes 34, and liquid crystal material 13 disposed between the front panel 20 and the rear panel 30.

The front panel 20 includes a first substrate 21 typically in the form of a glass substrate and a polarizing film 26 provided on the outer face of the first substrate 21. A color filter 22 is provided on the inner face of the first substrate 21 and coated with an overcoat layer 23 made of an acrylic resin material or an epoxy resin material. Transparent first electrodes 24 are formed on the overcoat layer 23. The transparent first electrodes 24 are also called common electrodes and typically made of ITO, and an orientation film 25 is formed on the transparent first electrodes 24. Meanwhile, the rear panel 30 includes a second substrate 31 typically in the form of a glass substrate, switching elements 32 formed on the inner face of the second substrate 31, transparent second electrodes 34, and a polarizing film 36 provided on the outer face of the second substrate 31. The switching elements 32 are controlled between conducting and non-conducting states by the switching elements 32 and are also called pixel electrodes and typically made of ITO. An orientation film 35 is formed over the overall area of the rear panel 30 including the transparent second electrodes 34. The front panel 20 and the rear panel 30 are joined together at peripheral portions thereof using a sealing material not shown. It is to be noted that the switching elements 32 do not necessarily have to be formed from a TFT but may be formed, for example, from a MIM element. An insulating layer 37 is interposed between different switching elements 32.

The components and the liquid crystal material from which the transmission type color liquid crystal display apparatus is composed can be formed from well-known members and materials. Therefore, detailed description of them is omitted herein.

Figure 6A:
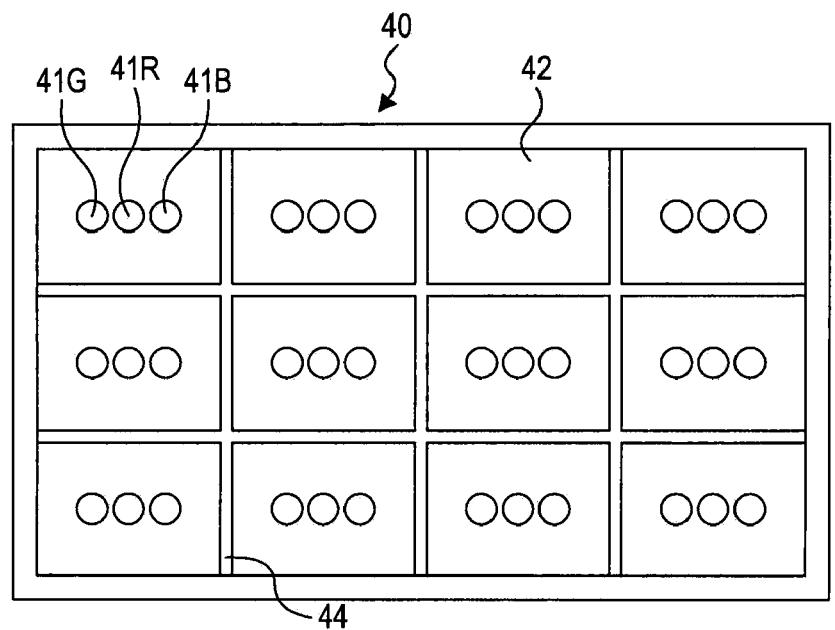
FIG. 6A is a view schematically showing an arrangement state of light emitting diodes and so forth in the backlight in the working examples.
Figure 6B:
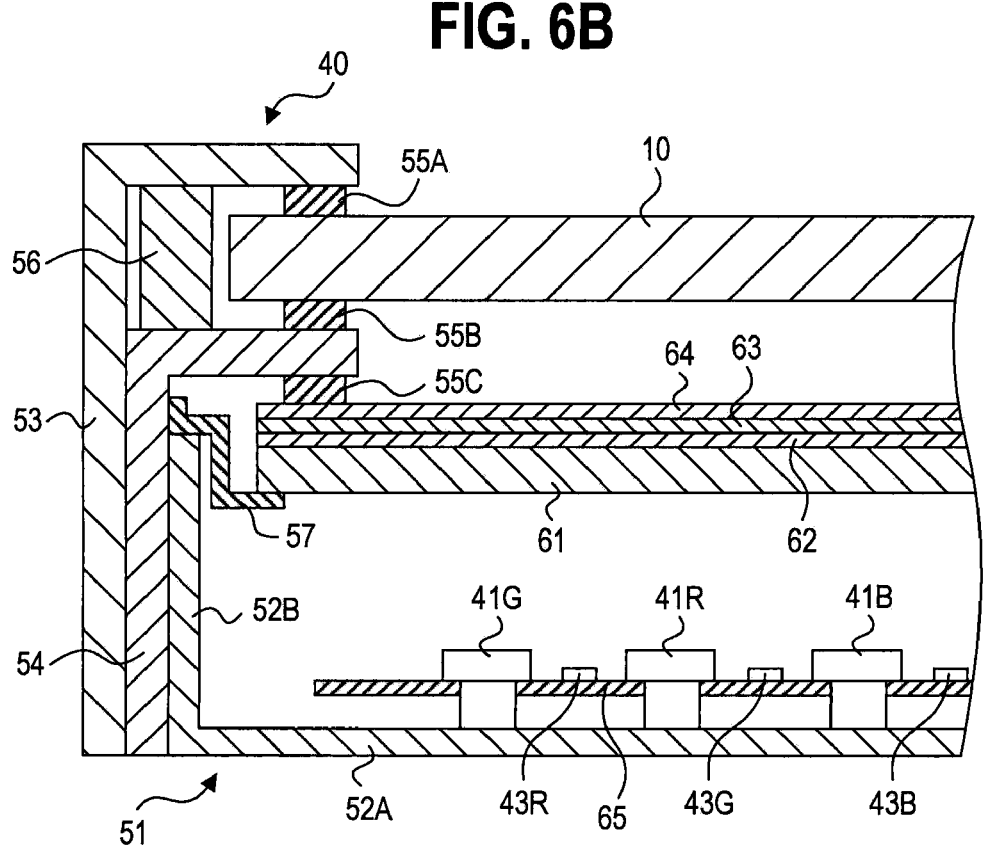
FIG. 6B is a schematic partial sectional view of the display apparatus which includes a color liquid crystal display apparatus and a backlight according to the working examples.

A backlight (direct type planar light source apparatus) 40 includes P×Q light source units 42 disposed individually corresponding to the P×Q virtual display area units 12. Each of the light source units 42 illuminates the display area unit 12 corresponding thereto from the back side. The light sources provided in the light source units 42 are controlled individually. It is to be noted that, while the backlight 40 is positioned below the color liquid crystal display apparatus 10, the color liquid crystal display apparatus 10 and the backlight 40 are shown separately in FIG. 4. A state of arrangement of light emitting diodes and so forth of the backlight 40 is schematically illustrated in FIG. 6A, and a schematic partial section of the display apparatus composed of the color liquid crystal display apparatus 10 and the backlight 40 is shown in FIG. 6B. Each of the light sources is formed from a light emitting diode 41 which is driven in accordance with a pulse width modulation (PWM) control method.

As seen from the schematic partial section of the display apparatus of FIG. 6B, the backlight 40 includes a housing 51 which in turn includes an outer side frame 53 and an inner side frame 54. The transmission type color liquid crystal display apparatus 10 is held at an end portion thereof by the outer side frame 53 and the inner side frame 54 such that it is sandwiched by spacers 55A and 55B. Further, a guide member 56 is disposed between the outer side frame 53 and the inner side frame 54 so that the color liquid crystal display apparatus 10 sandwiched by the outer side frame 53 and the inner side frame 54 may not be disposed. At an upper portion in the inside of the housing 51, a diffusion plate 61 is attached to the inner side frame 54 through a spacer 55C and a bracket member 57. Further, an optical function sheet group including a diffusion sheet 62, a prism sheet 63 and a polarized light conversion sheet 64 is layered on the diffusion plate 61.

A reflection sheet 65 is provided at a lower portion in the housing 51. The reflection sheet 65 is disposed such that a reflecting face thereof is opposed to the diffusion plate 61, and is attached to the bottom wall 52A of the housing 51 through an attaching member not shown. The reflection sheet 65 may be formed from a silver-increased reflecting film having a structure that a silver reflecting film, a low refraction factor film and a high refraction factor film are laminated on a sheet base in advance. The reflection sheet 65 reflects light emitted from a plurality of light emitting diodes 41 (light source 41) or, as occasion demands, light reflected from partition walls 44 shown in FIG. 6A. Thus, red light, green light and blue light emitted from a plurality of red light emitting diodes 41R (light sources 41R) for emitting red light, a plurality of green light emitting diodes 41G (light sources 41G) for emitting green light and a plurality of blue light emitting diodes 41B (light sources 41B) for emitting blue light, respectively, are mixed thereby to obtain white light having a high color purity as illuminating light. This illuminating light passes through the optical function sheet group including the diffusion plate 61, diffusion sheet 62, prism sheet 63 and polarized light conversion sheet 64 and illuminates the color liquid crystal display apparatus 10 from the back side. The light source units 42 which compose the backlight 40 are partitioned by the partition walls 44. The partition walls 44 are attached to the bottom wall 52A of the housing 51 by attaching members not shown.

Photodiodes 43R, 43G and 43B serving as optical sensors are disposed in the proximity of the bottom wall 52A of the housing 51. It is to be noted that each of the photodiodes 43R has a red filter attached thereto in order to measure the optical intensity of red light and each of the photodiodes 43G has a green filter attached thereto in order to measure the optical intensity of green light while each of the photodiodes 43B has a blue filter attached thereto in order to measure the optical intensity of blue light. Here, one set of photodiodes 43R, 43G and 43B is attached to one light source unit 42. The light emitting states of the light sources 41R, 41G and 41B measured by the photodiodes 43R, 43G and 43B serving as optical sensors are the luminance and the chromaticity of the light sources 41R, 41G and 41B.

The light sources 41R, 41G and 41B may be arranged, for example, such that a plurality of light emitting diode units each including a set of a red light emitting diodes 41R for emitting red light of a wavelength typically of 640 nm, a green light emitting diode 41G for emitting green light of a wavelength typically of 530 nm and a blue light emitting diode 41B for emitting blue light of a wavelength typically of 450 nm are arranged in both of a horizontal direction and a vertical direction. It is to be noted that, in the arrangement just described, one light emitting diode unit is disposed in one light source unit 42.

Figure 5:
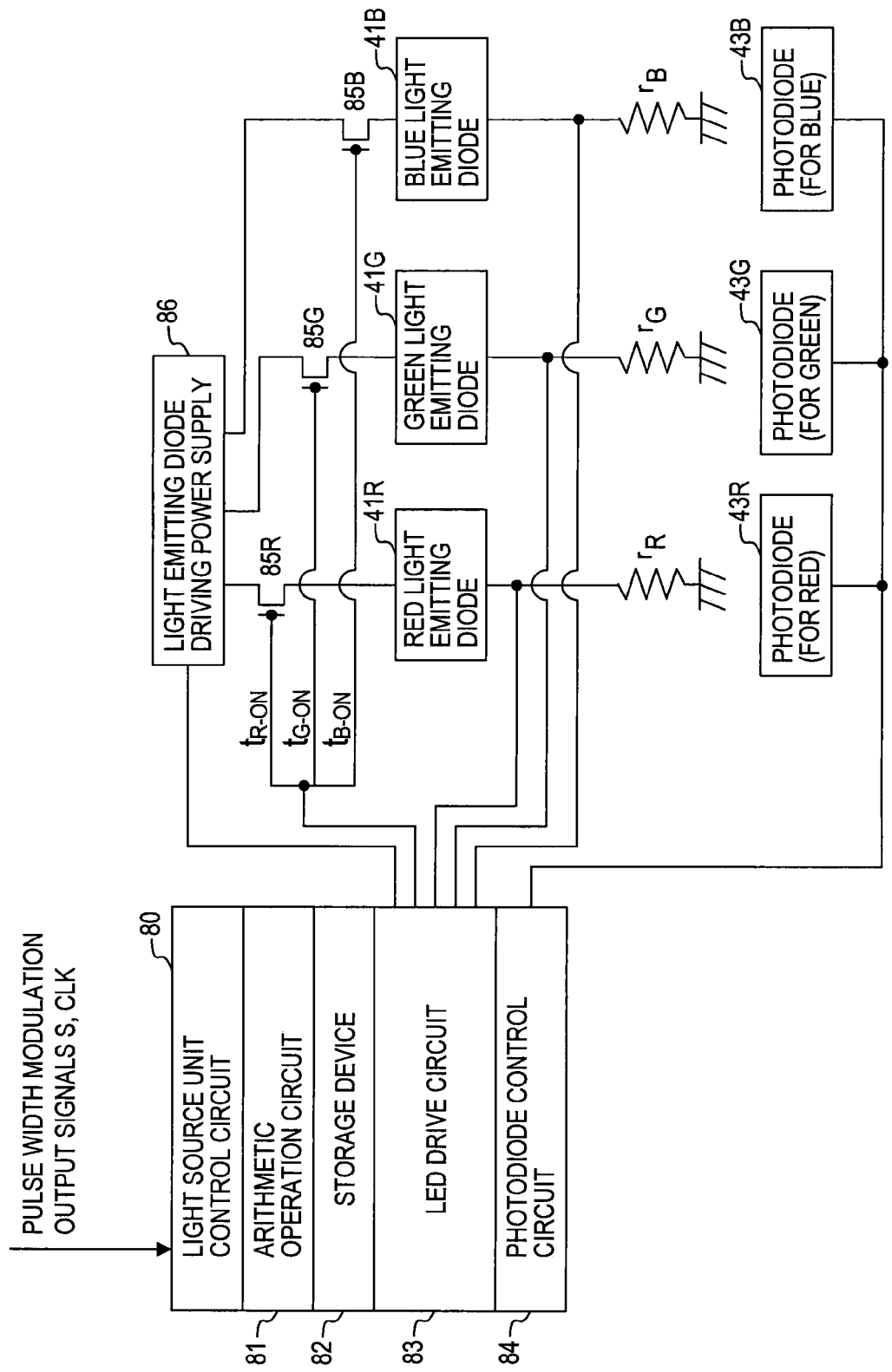
FIG. 5 is a block diagram illustrating a concept of part of a drive circuit suitable for use with the working examples.

Referring to FIGS. 4 and 5, the backlight 40 and the color liquid crystal display apparatus 10 are driven in accordance with an input signal from the outside (display circuit) by a drive section. The drive section includes a backlight control section 70 and light source unit drive circuits 80 which serve as a control section, and a liquid crystal display apparatus drive circuit 90. The backlight control section 70 and the light source unit drive circuits 80 perform on/off control of the red light emitting diodes 41R, green light emitting diodes 41G and blue light emitting diodes 41B, which compose the backlight 40, in accordance with a pulse width modulation control method. The backlight control section 70 includes an arithmetic operation circuit 71 and a storage device (memory) 72. The backlight control section 70 controls the light emitting condition of the light source unit 42 corresponding to each of the display area units 12 based on a display area unit internal maximum input signal which has a maximum value $x_{U\text{-}max}$ from among input signals corresponding to the display area unit 12. Meanwhile, each of the light source unit drive circuits 80 includes an arithmetic operation circuit 81, a storage device (memory) 82, an LED drive circuit 83, a photodiode control circuit 84, switching elements 85R, 85G and 85B each formed from an FET, and a light emitting diode driving power supply 86 in the form of a constant current source. The component circuits and so forth of the backlight control section 70 and the light source unit drive circuits 80 may be well-known circuits and so forth. Meanwhile, the liquid crystal display apparatus drive circuit 90 for driving the color liquid crystal display apparatus 10 is composed of well-known circuits such as a timing controller 91. The color liquid crystal display apparatus 10 includes gate drivers, source drivers and so forth for driving the switching elements 32 individually formed from FETs and forming liquid crystal cells. The light emitting conditions of the light sources 41R, 41G and 41B in a certain image display frame are measured by the photodiodes 43R, 43G and 43B, respectively, and outputs of the photodiodes 43R, 43G and 43B are inputted to the photodiode control circuit 84. Each of the photodiode control circuit 74 and the arithmetic operation circuits 81 produces data (signal) of the luminance and chromaticity of the light sources 41R, 41G and 41B from the outputs of the photodiodes 43R, 43G and 43B and sends the data to the LED drive circuit 83. Thus, the light emitting conditions of the light sources 41R, 41G and 41B for a next image display frame are controlled by the LED drive circuit 83. In this manner, a feedback system is formed from the components mentioned. Further, on the downstream side of the light sources 41R, 41G and 41B, resistors rR, rG and rB for current detection are inserted in series to the light sources 41R, 41G and 41B, respectively. Thus, current flowing through the resistors rR, rG and rB is converted into voltages, and operation of the light emitting diode driving power supply 86 is controlled so that the voltage drops across the resistors rR, rG and rB may be predetermined values under the control of the LED drive circuit 83. While a single light emitting diode driving power supply 86 is shown in FIG. 5, actually those light emitting diode driving power supplies 86 for individually driving the light sources 41R, 41G and 41B are disposed.

While the display area formed from pixels arranged in a matrix is divided in P×Q display area units, where this state is representing using "rows" and "columns", it is considered that the display area is divided in display area units arranged in Q rows×P columns. Further, while a display area unit 12 is formed from a plurality of (M×N) pixels, where this state is represented using "rows" and "columns", it is considered that a display area unit 12 is formed from pixels arranged in N rows×M columns. It is to be noted that a display area or a light source unit at a position of the qth row and the pth column (q=1, 2, ..., Q and p=1, 2, ..., P) in a matrix is sometimes represented as display area unit $12_{(q,p)}$ or light source unit $42_{(q,p)}$, and subscripts "(q,p)" or "-(q,p)" are sometimes added to an element if an item relating to the display area unit $12_{(q,p)}$ or the light source unit $42_{(q,p)}$. Further, a red light emitting sub-pixel (sub-pixel [R]), a green light emitting sub-pixel (sub-pixel [G]) and a blue light emitting sub-pixel (sub-pixel [B]) are sometimes referred to collectively as "sub-pixels [R, G, B]". Further, a red light emitting control signal, a green light emitting control signal and a blue light emitting control signal inputted to sub-pixels [R, G, B] in order to control operation of the sub-pixels [R, G, B] (particularly, to control, for example, the light transmission factor (numerical aperture) are sometimes referred to collectively as "control signals [R, G, B]. Similarly, a red light emitting sub-pixel input signal, a green light emitting sub-pixel input signal and a blue light emitting sub-pixel input signal inputted from the outside to the drive section in order to drive sub-pixels [R, G, B] which compose the display area are sometimes referred to collectively as "input signals [R, G, B]".

Each pixel is composed of a set of three sub-pixels including a sub-pixel [R] (red light emitting sub-pixel, another sub-pixel [G] (green light emitting sub-pixel) and a further sub-pixel [B] (blue light emitting sub-pixel). In the description of several working examples hereinafter given, the luminance of each of sub-pixels [R, G, B] is controlled by 8-bit control among $2^8$ stages from 0 to 255. Accordingly, the values xR, xG and xB of input signals [R, G, B] inputted to the liquid crystal display apparatus drive circuit 90 in order to drive the sub-pixels [R, G, B] of each of pixels which compose each of the display area units 12 can assume $2^8$ different values. Further, also the values SR, SG and SB of pulses width modulation output signals for controlling the light emitting time of a red light emitting diode 41R, a green light emitting diode 41G and a blue light emitting diode 41B which compose each of the light source units can assume $2^8$ different values from 0 to 255. However, the gradation control is not limited to that described above, but, for example, 10-bit control may be applied such that the gradation control is performed among $2^8$ stages from 0 to 1,023. In this instance, a representation of a value of eight bits may be, for example, increased to four times.

To each of the pixels, a control signal for controlling the light transmission factor Lt of the pixel is supplied from the drive section. In particular, control signals [R, G, B] for controlling the light transmissions factor Lt of the sub-pixels [R, G, B] are supplied form the liquid crystal display apparatus drive circuit 90 to the sub-pixels [R, G, B], respectively. More particularly, the liquid crystal display apparatus drive circuit 90 produces control signals [R, G, B] from input signals [R, G, B] inputted thereto, and supplies (outputs) the control signals [R, G, B] to the sub-pixels [R, G, B], respectively. It is to be noted that, since the light source luminance $Y_2$ of the light source unit 42 is varied for each one image display frame, the control signals [R, G, B] basically have values obtained by correcting (compensating for) values of the input signals [R, G, B] to the 2.2th power based on the variation of the light source luminance $Y_2$. Then, the control signals [R, G, B] are signaled from the timing control 91, which composes the liquid crystal display apparatus drive circuit 90, to the gate drivers and the source drivers of the color liquid crystal display apparatus 10 by a well-known method. Consequently, the switching elements 32 which form the sub-pixels are driven in accordance with the control signals [R, G, B] to apply desired voltages to the transparent first electrodes 24 and the transparent second electrodes 34 which compose the liquid crystal cells thereby to control the light transmission factors Lt of the sub-pixels. Here, as the value of the control signals [R, G, B] increases, the light transmission factors Lt of the sub-pixels [R, G, B] increases and the value of the light transmission factor Lt of the sub-pixels [R, G, B] (numerical) aperture of the sub-pixels) increases. In other words, an image (normally in the form of a kind of spot) formed from light passing through the sub-pixels [R, G, B] is bright.

The control of the display luminance y and the light source luminance Y2 is performed for each one display frame, for each one display area unit and for each one light source unit in the image display of the color liquid crystal display apparatus 10. Further, operation of the color liquid crystal display apparatus 10 and operation of the backlight 40 in one image display frame are synchronized with each other.

Working Example 1

The working example 1 relates to a display apparatus and a driving method for the display apparatus according to a first embodiment which is one of embodiments of the present invention. In the working example 1, the backlight control section 70 and the light source unit drive circuits 80 which correspond to a control section check whether or not a low luminance light emitting display area unit exists and besides whether or not a high luminance light emitting display area unit exists around a low luminance light emitting display area unit. Then, where a high luminance light emitting display area unit exists around a low luminance light emitting display area unit, a process of increasing the luminance of a light source unit corresponding to the low luminance light emitting display area unit is performed.

In the working example 1 and working examples 2 and 3 hereinafter described, a first prescribed value (PD1) has one of values of lower than 25% of the maximum value $x_{in-max}$ of an input signal. Meanwhile, a second prescribed value (PD2) has the value of 100% of the maximum value xMAX among the values $x_{U-max}$ of the display area unit internal maximum input signal, that is, the maximum value xMAX itself. It is to be noted that, since stepwise control among $2^8$ states from 0 to 255 is performed, the maximum value $x_{in-max}$ of the input signal is a value corresponding to "255".

It is to be noted that also other examples of setting are possible. As one of such setting examples, if the second prescribed value (PD2) exceeds the first prescribed value (PD1), then the first prescribed value (PD1) may be set to a value lower than 25% of the maximum value xIn-max of the input signal such as, for example, to 15% while the second prescribed value (PD2) is set to a value higher than 25% which is the maximum $x_{in-max}$ of the input signal such as, for example, to 85%. Further, where the second prescribed value (PD2) is varied in response to the input signal, the lower limit value may be set so that the second prescribed value (PD2) may not become lower than the first prescribed value (PD1).

In the following, the driving method for the display apparatus according to the working example 1 is described below with reference to FIGS. 1A to 1D, 3, 4 and 5.

[Step 100]

Input signals [R, G, B] for one image display frame and a clock signal CLK signaled from a well-known display apparatus such as a scanning converter are inputted to the backlight control section 70 and the liquid crystal display apparatus drive circuit 90 as seen in FIG. 4. It is to be noted that the input signals [R, G, B] are output signals, for example, from an image pickup tube and outputted, for example, from a broadcasting station and are inputted also to the liquid crystal display apparatus drive circuit 90 in order to control the light transmission factors Lt of the pixels, and when the input light amount to the image pickup tube is represented by yin, they are represented by a function of the input light amount yin to the 0.45th power. Then, the value xR, xG and xB of the input signals [R, G, B] for one image display frame inputted to the backlight control section 70 are stored once into the storage device 72 which is a component of the backlight control section 70. Also the values xR, xG and xB of the input signals [R, G, B] for one image display frame inputted to the liquid crystal display apparatus drive circuit 90 are stored once into a storage device not shown which is a component of the liquid crystal display apparatus drive circuit 90.

[Step 110]

Then, the arithmetic operation circuit 71 which is a component of the backlight control section 70 reads out the values of the input signals [R, G, B] stored in the storage device 72. Thus, the arithmetic operation circuit 71 determines the value $x_{U-max(q,p)}$ of the display area unit internal maximum input signal of the highest value from among the values $x_{R-(q,p)}$, $x_{G-(q,p)}$ and $x_{B-(q,p)}$ of the input signals [R, G, B] for driving the sub-pixels [R, G, B] of all of the pixels which compose the (p,q)th (first, p=1 and q=1) display area unit $12_{(q,p)}$. Then, the value $x_{U-max\ (q,p)}$ of the display area unit internal maximum input signal is stored into the storage device 72. This step is executed successively for all of m=1, 2, . . . , M and n=1, 2, . . . N, that is, for the M×N pixels.

For example, where the value $x_{R-(q,p)}$ corresponds to "110" and the value $x_{G-(q,p)}$ corresponds to "250" while the value $x_{B-(q,p)}$ corresponds to "50", the value $x_{U-max(q,p)}$ corresponds to "250".

This operation is repeated from (p,q)=(1,1) to (p,q)=(P,Q), and the value $x_{U-max(p,q)}$ of the display area unit internal maximum internal signal in all of the display area units $12_{(q,p)}$ are stored into the storage device 72.

Simultaneously, the arithmetic operation circuit 71 checks presence/absence of a low luminance light emitting display area unit in which the value $x_{U-max(q,p)}$ of the display area unit internal maximum input signal is lower than the first prescribed value PD1. If at least one such low luminance light emitting display area unit exists, then the position (p,q) of the unit it stored into the storage device 72, and a low luminance light emitting display area unit existence flag is changed from an initial value "0" already in a reset state to another value "1". Further, the arithmetic operation circuit 71 checks whether or not a high luminance light emitting display area unit whose value $x_{U-max(q,p)}$ of the display area unit internal maximum input signal is equal to or higher then the second prescribed value PD2 exists around the low luminance light emitting display area unit. If such a high luminance light emitting display area unit as described above exists, then the position (p,q) of the high luminance light emitting display area unit is stored into the storage device 72, and a high luminance light emitting display area unit existence flag is changed from an initial value "0" already in a reset state to another value "1".

It is to be noted that, in the working example 1, it is assumed that, where a high luminance light emitting display area unit exists adjacent (contiguously) to a low luminance light emitting display area unit in any one of all eight directions of the low luminance light emitting display area unit, it is determined that a high luminance light emitting display area unit exists around a low luminance light emitting display area unit.

Figure 1B:
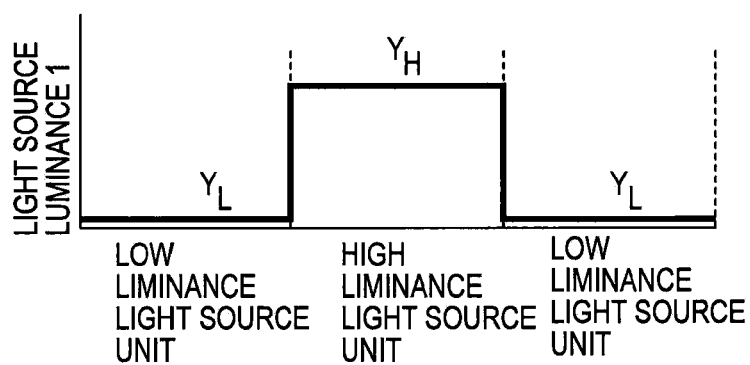

A state of the input signals for controlling the light transmission factors (numerical apertures) for the pixels which compose a display area unit where the low luminance light emitting display area unit existence flag is "1" and the high luminance light emitting display area unit existence flag is "1" is schematically illustrated in FIG. 1A. Further, a state of the light source luminance (light source luminance 1) in this state is schematically illustrated in FIG. 1B. It is to be noted that the value $x_{U-max}$ of the display area unit internal maximum input signal in a high luminance light emitting display area is represented by xH, and the value $x_{U-max}$ of the display area unit internal maximum input signal of a low luminance light emitting display area unit is represented by xL. Further, in this state, the light source luminance 1 of the light source unit corresponding to the high luminance light emitting display area unit has the high value YH while the light source luminance 1 of a light source unit corresponding to the low luminance light emitting display area unit has the low value YL. The state of the light source luminance 1 illustrated in FIG. 1B and the state of the light source luminance (light source luminance 1 and 2) illustrated in FIGS. 1C and 1D and FIGS. 2B, 2C and 2D hereinafter described are ideal states. Actually, the light source luminance of a certain light source unit is influenced by the light source luminance of the other light source units. It is to be noted that, in FIGS. 1A to 2D, a high luminance light emitting display area unit and a low luminance light emitting display area unit are represented as high luminance display area unit and low luminance display area unit, respectively, and light source units corresponding to them are represented as high luminance light source unit and low luminance light source unit, respectively.

[Step 120]

Then, where the low luminance light emitting display area unit existence flag is "1" and the high luminance light emitting display area unit existence flag is "1", a process of increasing the luminance of the light source unit corresponding to the low luminance light emitting display area unit is executed. In particular, the following process is executed. Here, it is assumed that control signals [R, G, B] corresponding to the display area unit internal maximum input signal (whose value $x'_{U-max}$ exceeds the maximum value xMAX: this similarly also to the working example 2 hereinafter described) are supplied to the sub-pixels [R, G, B]. Besides, it is assumed that the light transmission factor (numerical aperture) of the sub-pixels [R, G, B] at this time is corrected to a light transmission factor first prescribed value Lt1. In this instance, such a process is executed that a light source luminance $Y_2'$ (FIG. 1C) of the light source unit with which the luminance of the sub-pixels [R, G, B] becomes equal to the display luminance second prescribed value of ($y_2$; in FIG. 1D, indicated by yL') is obtained. In other words, the light source luminance of the light source unit is adjusted under the control of the light source unit drive circuit $80_{(q,p)}$.

In the working example 1, this process is executed for the light source units corresponding to all low luminance light emitting display area units. Further, it is assumed that control signals [R, G, B] corresponding to the display area unit internal maximum input signal (whose value is $x_{U-max}$) are supplied. Besides, it is assumed that the light transmission factor (numerical aperture) of the sub-pixels [R, G, B] at this instance is corrected to the light transmission factor first prescribed value Lt1. In this instance, such a process that the light source luminance becomes the light source luminance $y_2'$ is performed for all those light source units wherein the light source luminance of a light source unit for making the luminance of the sub-pixels [R, G, B] equal to light source luminance $Y_2$ is lower than the light source luminance $Y_2'$. Further, for the other light source units, it is assumed that control signals [R, G, B] corresponding to the display area unit internal maximum input signal (whose value is $x_{U-max}$) are supplied to the sub-pixels [R, G, B]. Also it is assumed that the light transmission factor (numerical aperture) of the sub-pixels [R, G, B] is corrected to the light transmission factor first prescribed value Lt1. In this instance, such a process that the light source luminance $Y_2$ of the light source unit for making the luminance of the sub-pixels [R, G, B] equal to the light source luminance $y_2$ is obtained is executed.

Figure 1C:
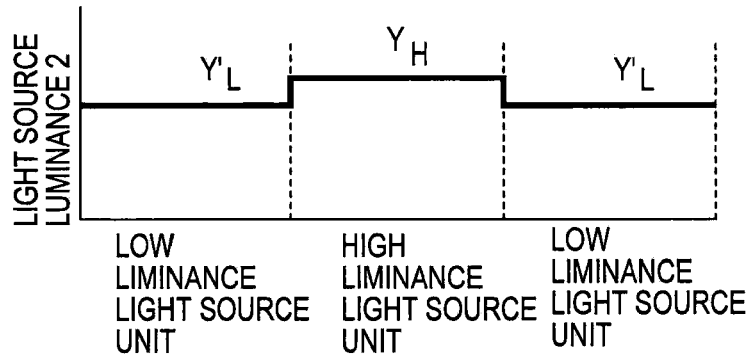
Figure 1D:
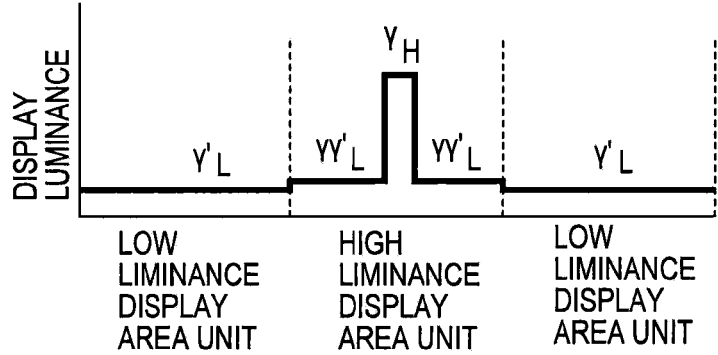

In particular, in the working example 1, the light source luminance is YL' also with a light source unit which is darkest in state just described. A state of the light source luminance (light source luminance 2) in this state is schematically illustrated in FIG. 1C, and a state of the display luminance is illustrated in FIG. 1D.

Figure 11A:
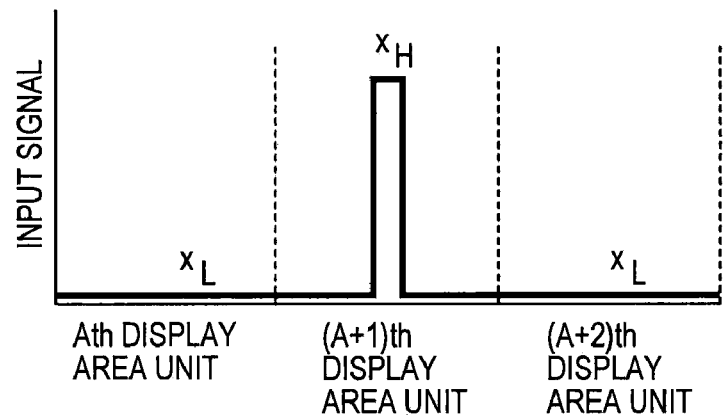
FIGS. 11A to 11C are diagrammatic views schematically illustrating a state of the light transmission factor (numerical aperture), a state of the light source luminance and a state of the display luminance at pixels which compose display area units and illustrating problems of a related art apparatus and method.
Figure 11B:
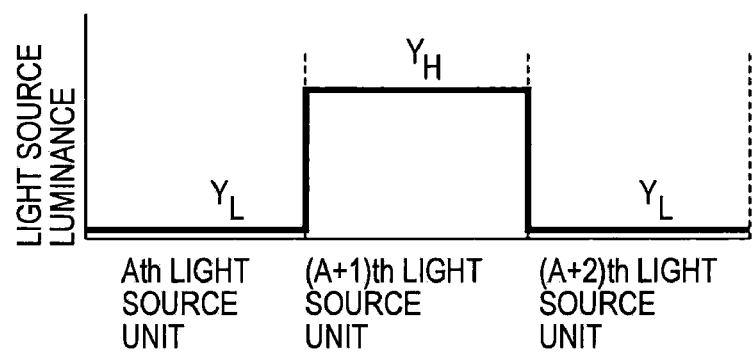
Figure 11C:
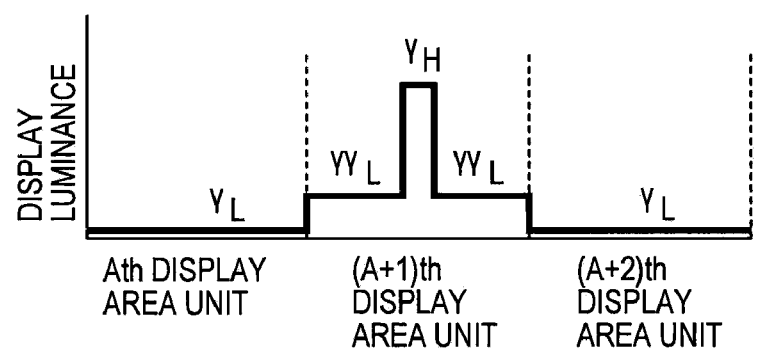

Incidentally, as described hereinabove, the light transmission factor of a liquid crystal cell may not normally be reduced by fully to "0". Accordingly, even if the light transmission factor (numerical aperture) of the sub-pixels is set to the lowest value, light leaks from the liquid crystal cell. As a result, the difference which appears between the display luminance yyL' at the other pixels which compose the high luminance light emitting display area unit and the display luminance yL' at the pixels which compose the low luminance light emitting display area unit can be reduced from that illustrated in FIG. 11C in the following cases; when it is assumed that an input signal corresponding to a control signal to a certain pixel in a high luminance light emitting display area unit is the display area unit internal maximum input signal and besides has the high value xH; and when it is assumed that a control signal corresponding to an input signal of the low value xL is supplied to the other pixels which compose the high luminance light emitting display area unit while it is assumed that a control signal corresponding to an input signal of the low value xL is supplied also to all pixels which form the low luminance light emitting display area unit (refer to FIG. 1A). Therefore, such a situation that a black display portion is observed as if it were afloat is eliminated, and a uniform low display luminance state can be obtained. Thus, enhancement of the picture quality of image display can be achieved.

Meanwhile, where the low luminance light emitting display area unit existence flag is "0" or where the high luminance light emitting display area unit existence flag is "0", for example, the following process is performed for all of the light source units $42_{(q,p)}$. In particular, when it is assumed that control signals $[R, G, B]_{(q,p)}$ corresponding to the display area unit internal maximum input signal (whose value is $x_{U\text{-}max(q,p)}$) are supplied to the sub-pixels $[R, G, B]_{(q,p)}$ and besides it is assumed that the light transmission factor (numerical aperture) of the sub-pixels $[R, G, B]_{(q,p)}$ is corrected to the light transmission factor first prescribed value Lt1, such a process that the light source luminance $Y_{2\text{-}(q,p)}$ for the light source units $42_{(q,p)}$ for making the luminance of the sub-pixels $[R, G, B]_{(q,p)}$ equal to the display luminance second prescribed value ($y_{2\text{-}(q,p)}$) is obtained is performed.

In the process at step 120 described above, the light source luminance $Y_2'$ and $Y_2$ should be controlled for each one image display frame and for each one light source unit so as to satisfy the expression (1) given below. More particularly, the luminance of the light emitting diode 41 should be controlled based on an expression (2) which represents a light source luminance control function $q(x_{nol\text{-}max})$ and the light source luminance $Y_2'$ and $Y_2$ should be controlled so as to satisfy the expression (1):

$$Y_2 \cdot Lt1 = Y_1 \cdot Lt2 \quad (1)$$

$$g(x_{nol\text{-}max}) = a1 \cdot (x_{nol\text{-}MAX})2.2 + a0 \quad (2)$$

Figure 8A:
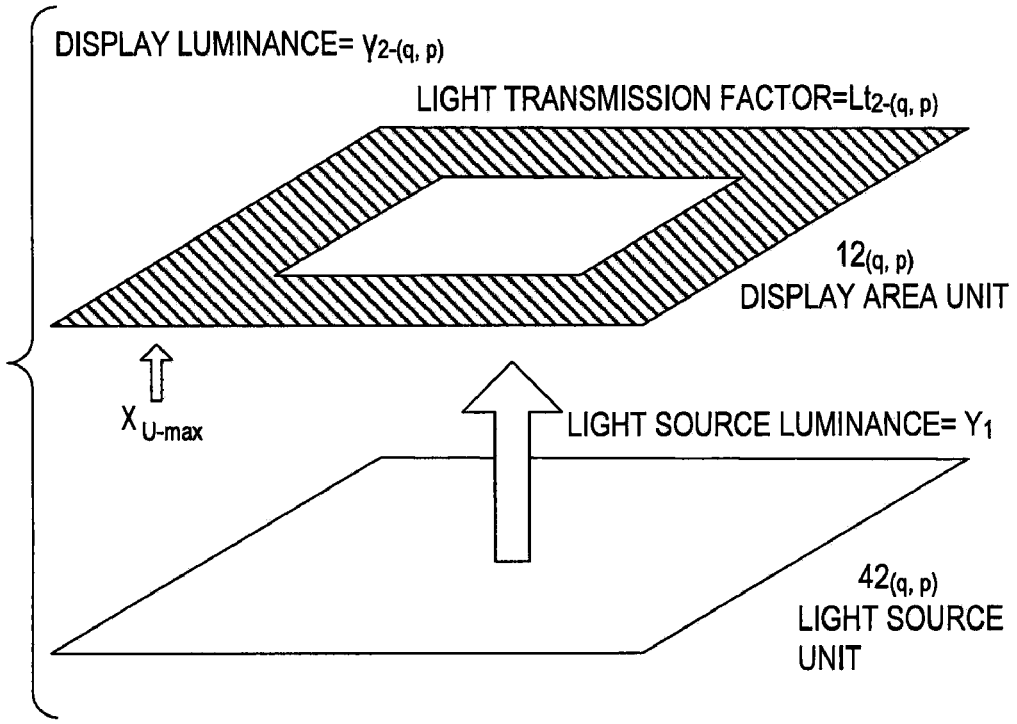
FIGS. 8A and 8B are schematic views illustrating a concept of adjustment of the light source luminance of a light source unit under the control of a drive section so that a display luminance second prescribed value is obtained by the light source unit when it is assumed that a control signal corresponding to an input signal having a value equal to the value of a display area unit internal maximum input signal is supplied to a pixel.
Figure 8B:
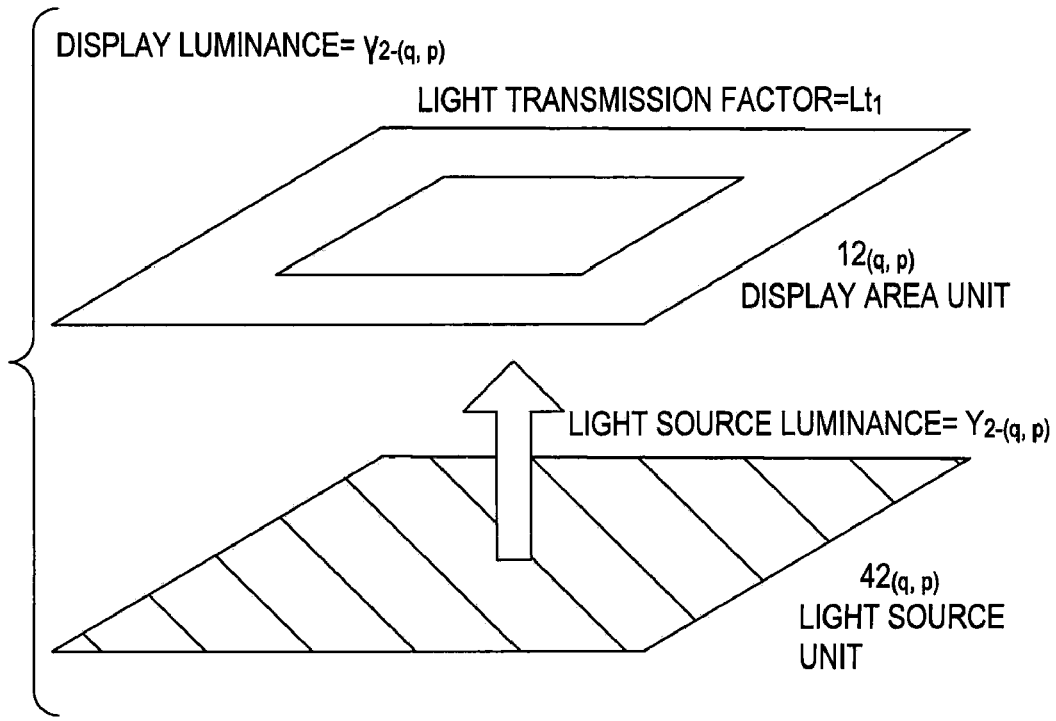

A concept of such control as described above is illustrated in FIGS. 8A and 8B. It is to be noted, however, that it is necessary to perform correction based on the influence of the other light source units 42 for the light source luminance $Y_2'$ and $Y_2$. Further, the relationship of the factors relating to the control of the light source luminance $Y_2'$ and $Y_2$, that is, the relationship among the values $x_{U\text{-}max}$ and $x'_{U\text{-}max}$ of the display area unit internal maximum input signal, the values of control signals corresponding to input signals having values equal to the maximum values $x_{U\text{-}max}$ and $x'_{U\text{-}max}$, the light source luminance $Y_2$ when it is assumed that such control signals are supplied to pixels (sub-pixels), the light transmission factors (numerical apertures) [light transmission factor second prescribed values Lt2] of the sub-pixels in this instance, and luminance control parameters for the light source units with which the light source luminance $Y_2'$ and $Y_2$ are obtained where the light transmission factors (numerical apertures) of the sub-pixels are set to the light transmission factor first prescribed value Lt1, should be determined and stored into the storage device 72 or the like in advance.

In the expression (2) above, where the highest value of the input signal (input signals [R, G, B]) inputted to the liquid crystal display apparatus drive circuit 90 in order to drive a pixel (or sub-pixels [R, G, B] which composes a pixel) is represented by $x_{in\text{-}max}$, $$x_{nol\text{-}max} = x_{U\text{-}max}/x_{in\text{-}max}$$

is satisfied, and a1 and a0 are fixed values and have relationships given by $$a1 + a0 = 1$$

$$0 < a0 < 1, \ 0 < a1 < 1$$

For example, a1 and a0 may be set to $$a1 = 0.99$$

$$a0 = 0.01$$

Further, since the values xR, xG and xB of the input signals [R, G, B] can assume $2^8$ different values as described above, the value of xIn-max corresponds to "255".

Incidentally, in the backlight, where luminance control of the light source unit 42(1,1) of (p,q)=(1,1) is assumed, it is necessary to take an influence from the other P×Q light source units 42 into consideration. Since such an influence of the other light source units 42 upon the light source unit 42 as just described is known in advance from light emission profiles of the light source units 42, the difference can be calculated by reverse calculation, and as a result, such correction as described above can be performed. The basic form of arithmetic operation is described below.

The luminance values (light source luminance $Y_2'$ and $Y_2$) necessary for the P×Q light source units 42 based on the requirements of the expressions (1) and (2) are represented by a matrix [LP×Q]. Further, the luminance of a certain light source unit obtained when only the certain light source unit is driven while the other light source units are not driven is determined in advance with regard to the P×Q light source units 42. The luminance values in this instance are represented by a matrix [L'×P×Q]. Further, the correction coefficients are represented by a matrix [αP×Q]. Consequently, a relationship of the matrices can be represented by the following expression (3):

$$[LP \times Q] = [L'P \times Q] \cdot [\alpha P \times Q] \quad (3\text{-}1)$$

The matrix [αP×Q] of the correction coefficients can be determined in advance. Consequently, the matrix [L'P×Q] may be determined from the expression (3-1). The matrix [L'P×Q] can be determined by arithmetic operation of a reverse matrix. In other words, $$[L'P \times Q] = [LP \times Q] \cdot [\alpha P \times Q]^{-1} \quad (3\text{-}2)$$

should be calculated. Then, the light emitting diodes 41(q,p) should be controlled so that the luminance values represented by the matrix [L'P×Q] may be obtained. More particularly, such operation and processing described should be performed using information (data table) stored in the storage device 82. It is to be noted that, since the values of the matrix [L'P×Q] in the control of the light emitting diodes 41$_{(q,p)}$ may not have a negative value, naturally it is necessary for results of the arithmetic operations to remain within a positive region.

Accordingly, the solution to the expression (2-2) may not be an exact solution but an approximate solution.

In this manner, a matrix [L'P×Q] of luminance when it is assumed that a light source unit is driven solely as describe above is determined based on the matrix [LP×Q] and the matrix [αP×Q] of correction coefficients obtained based on the values of the expressions (1) and (2) obtained by the arithmetic operation circuit 71 which composes the backlight control section 70. Further, the matrix [L'P×Q] is converted into corresponding integers within the range from 0 to 255 based on the conversion table stored in the storage device 72. In this manner, the values $S_{R-(q,p)}$ of a pulse width modulation output signal for controlling the light emitting time periods of the red light emitting diodes $41_{R(q,p)}$ in the light source units $42_{(q,p)}$, the values $S_{G-(q,p)}$ of a pulse width modulation output signal for controlling the light emitting time periods of the green light emitting diodes $41G_{(q,p)}$ and the values $S_{B-(q,p)}$ of a pulse width modulation output signal for controlling the light emitting time periods of the blue light emitting diodes $41_{(q,p)}$ can be obtained by the arithmetic operation circuit 71 which composes the backlight control section 70.

[Step 130]

Then, the values $S_{R-(q,p)}$, $S_{G-(q,p)}$ and $S_{B-(q,p)}$ of the pulse width modulation output signal obtained by the arithmetic operation circuit 71 which composes the backlight control section 70 are signaled to and stored into the storage device 82 of the light source unit drive circuit $80_{(q,p)}$ provided corresponding to the light source unit $42_{(q,p)}$. Also, the clock signal CLK is signaled to the light source unit drive circuit $80_{(q,p)}$ (refer to FIG. 5).

On-time tR-ON and off time tR-OFF of the red light emitting diode $41R_{(q,p)}$ which composes the light source unit $42_{(q,p)}$, on time tG-ON and off time tG-OFF of the green light emitting diode $41G_{(q,p)}$ and on time tB-ON and tB-OFF of the blue light emitting diode $41B_{(q,p)}$ are determined based on the values $S_{P-(q,p)}$, $S_{G-(q,p)}$ and $S_{B-(q,p)}$ of the pulse width modulation output signal by the arithmetic operation circuit 81. It is to be noted that $$t_{R-ON} + t_{R-OFF} = t_{G-ON} + t_{G-OFF} = t_{B-ON} + T_{B-OFF}$$

$$= \text{fixed value } t\text{Const}$$

Further, the duty ratio in driving of a light emitting diode based on the pulse width modulation can be represented by $$t\text{ON}/(t\text{ON}+t\text{OFF}) = t\text{ON}/t\text{Const}$$

Then, signals corresponding to the on time $t_{R-ON-(q,p)}$, $t_{G-ON-(q,p)}$ and $t_{B-ON-(q,p)}$ of the red light emitting diode $41R_{(q,p)}$, green light emitting diode $41G_{(q,p)}$ and the blue light emitting diode $41B_{(q,p)}$ which compose the light source unit $42_{(q,p)}$ are sent to the LED drive circuit 83. The LED drive circuit 83 supplies LED driving current from the light emitting diode driving power supply 86 to the light emitting diodes $41R_{(q,p)}$, $41G_{(q,p)}$ and $41B_{(q,p)}$ while the switching elements $85R_{(q,p)}$, $85G_{(q,p)}$ and $85B_{(q,p)}$ exhibit an on-state within the on time $t_{R-ON-(q,p)}$, $t_{G-ON-(q,p)}$ and $t_{B-ON-(q,p)}$ based on the signal values corresponding to the on time $t_{R-ON-(q,p)}$, $t_{G-ON-(q,p)}$ and $t_{B-ON-(q,p)}$. As a result, the light emitting diodes $41R_{(q,p)}$, $41G_{(q,p)}$ and $41B_{(q,p)}$ emit light within the on time $t_{R-ON-(q,p)}$, $t_{G-ON-(q,p)}$ and $t_{B-ON-(q,p)}$ in one image display frame. In this manner, the (p,q)th display area unit $12_{(q,p)}$ is illuminated to predetermined luminous intensity.

Figure 9A:
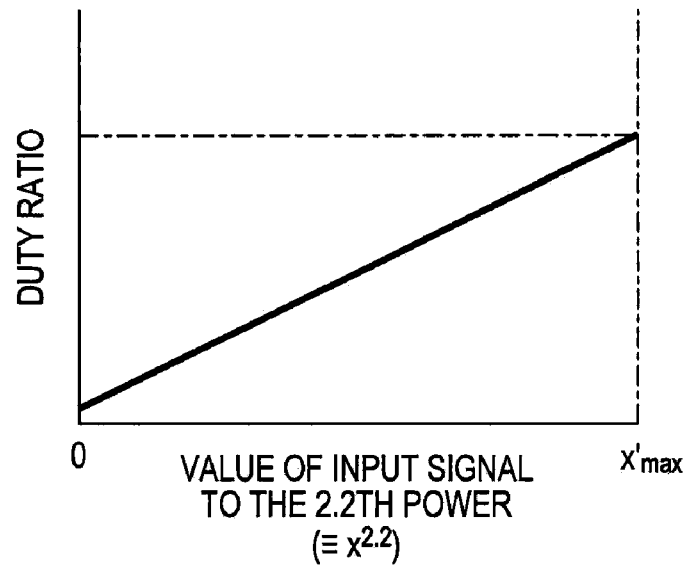
FIG. 9A is a diagrammatic view schematically illustrating a relationship between the value of an input signal to the 2.2th power and the duty ratio when the input signal is inputted to a liquid crystal apparatus drive circuit in order to drive a sub-pixel.
Figure 9B:
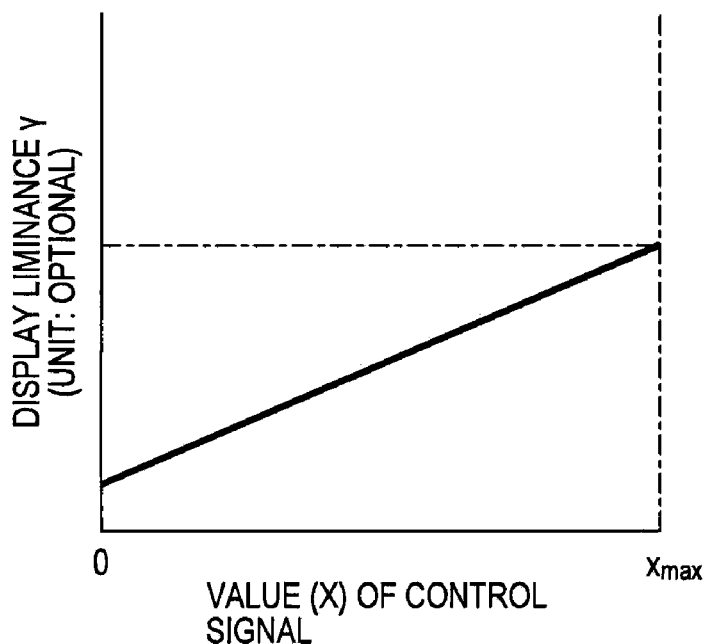
FIG. 9B is a diagrammatic view schematically illustrating a relationship between the value of a control signal for controlling the light transmission factor of the sub-pixel and the display luminance.
Figure 10A:
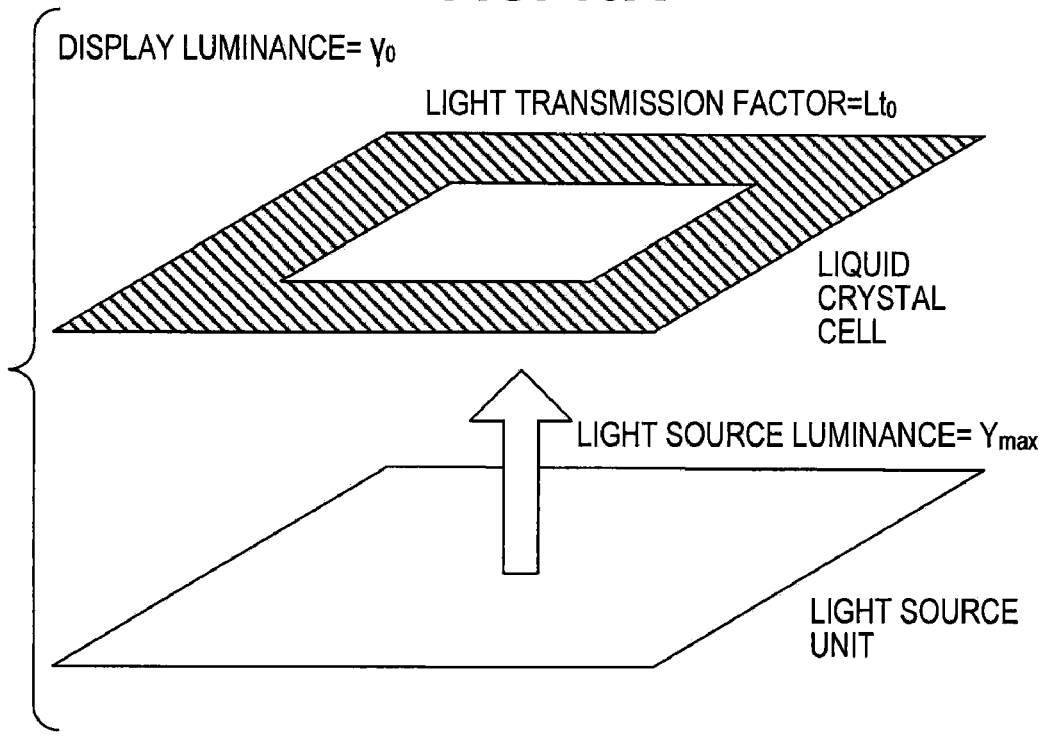
FIGS. 10A and 10B are schematic views illustrating a concept of a relationship among the light source luminance of a backlight, the light transmission factor (numerical aperture) of a pixel and the display luminance of a display area unit.
Figure 10B:
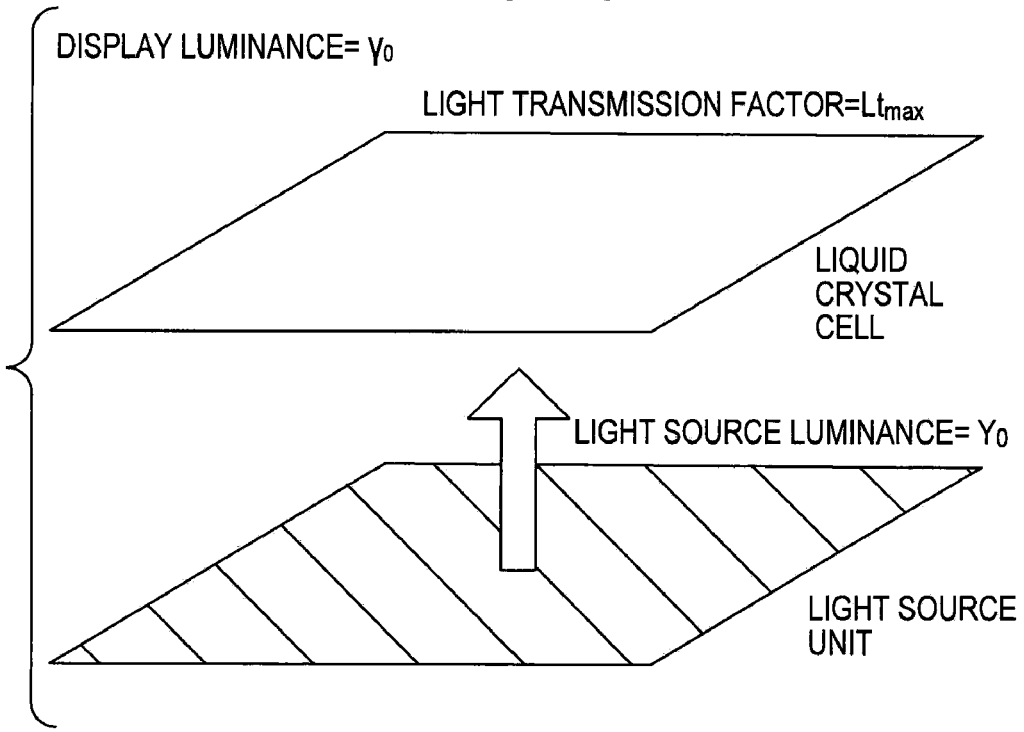

A state obtained in this manner is indicated by a solid line in FIGS. 9A and 9B. FIG. 9A schematically illustrates a relationship between the value ($=x^{2.2}$) of the input signal, which is inputted to the liquid crystal display apparatus drive circuit 90 in order to drive the sub-pixels, to the 2.2th power and the duty ratio (=tON/tConst). FIG. 9B schematically illustrates a relationship between the value X of a control signal for controlling the light transmission factor Lt of the sub-pixel and the display luminance y.

[Step 140]

On the other hand, the value $x_{R-(q,p)}$, $x_{G-(q,p)}$ and $x_{B-(q,p)}$ of the input signals [R, G, B] inputted to the liquid crystal display apparatus drive circuit 90 are sent to the timing controller 91. The timing controller 91 supplies (outputs) control signals [R, G, B]$_{(q,p)}$ corresponding to the input signals [R, G, B]$_{(q,p)}$ inputted thereto to the sub-pixels [R, G, B]$_{(q,p)}$. The values $x_{R-(q,p)}$, $x_{G-(q,p)}$ and $x_{B-(q,p)}$ of the control signals [R, G, B] produced by the timing controller 91 of the liquid crystal display apparatus drive circuit 90 and supplied from the liquid crystal display apparatus drive circuit 90 to the sub-pixels [R, G, B]$_{(q,p)}$. The values $x_{R-(q,p)}$, $x_{G-(q,p)}$ and $x_{B-(q,p)}$ of the input signals [R, G, B]$_{(q,p)}$ have the relationships given by the following expressions (4-1), (4-2) and (4-3), respectively:

$$X_{R-(q,p)} = fR(b_{1\_R} \cdot x_{R-(q,p)}^{2.2} + b_{0\_R}) \tag{4-1}$$

$$X_{G-(q,p)} = fG(b_{1\_G} \cdot x_{G-(q,p)}^{2.2} + b_{0\_G}) \tag{4-1}$$

$$X_{B-(q,p)} = fB(b_{1\_B} \cdot x_{B-(q,p)}^{2.2} + b_{0\_B}) \tag{4-1}$$

where b1_R, b0_R, b1_G, b0_G, b1_B and b0_B are constants. Further, since the light source luminance $Y_{2-(q,p)}$ of the light source unit $42_{(q,p)}$ is varied for each image display frame, the control signals [R, G, B]$_{(q,p)}$ basically have values obtained by performing correction (compensation) for the values of the input signals [R, G, B]$_{(q,p)}$ to the 2.2th power based on the variation of the light source luminance $Y_{2-(q,p)}$. In other words, in the present working example, since the light source luminance $Y_{2-(q,p)}$ varies for each one image display frame, the values $x_{R-(q,p)}$, $x_{G-(q,p)}$ and $x_{B-(q,p)}$ of the control signals [R, G, B]$_{(q,p)}$ are determined and corrected (compensated for so that the light source luminance $Y_{2-(q,p)}$ may be obtained at the light source luminance $Y_{2-(q,p)} (\leq Y_1)$. Then, the light transmission factor Lt of the sub-pixels is controlled using resulting values of the correction. Here, the functions fR, fG and fB of the expressions (4-1), (4-2), and (4-3) are determined in advance in order to perform such correction (compensation) as described above.

The image display operation for one image display frame is completed in this manner.

Working Example 3

The working example 2 relates to a display apparatus and a driving method thereof according to a second embodiment of an example of embodiments of the present invention. In the working example 2, the backlight control section 70 and the light source unit drive circuits 80 which correspond to a control section perform, where the ratio (RT1) of low luminance light emitting display area units is equal to or higher than a predetermined value (RT0) and a high luminance light emitting display area unit exists around a low luminance light emitting display area unit, a process of increasing the luminance of a light source unit corresponding to a low luminance light emitting display area unit. It is to be noted that, in the working example 2 and a working example 3 which is hereinafter described, the predetermined value RT0 is determined through investigations of a relationship between the expanse (area) of a low luminance portion and a phenomenon in which a black display portion is observed as if it were afloat.

In the following, the driving method for the display apparatus according to the working example 2 is described with reference FIGS. 1 and 3.

[Step 200]

First, a step similar to the step 100 in the working example 1 is executed.

[Step 210]

Then, a step similar to the step 110 in the working example 1 is executed to store the values $x_{U-max(q,p)}$ of the display area unit internal maximum input signal in all of the display area units 12$(q,p)$ into the storage device 72.

Simultaneously, the arithmetic operation circuit 71 determines the ratio RT1 of those low luminance light emitting display area units in which the value $x_{U-max(q,p)}$ of the display area unit internal maximum input signal is lower than the first prescribed value PD1 to all of the P×Q display area units. Then, if the ratio RT1 of the low luminance light emitting display area units is equal to or higher than the predetermined value RT0, then the positions (p,q) of the low luminance light emitting display area units are stored into the storage device 72, and the low luminance light emitting display area unit existence flags are changed from the initial value "0" already in a reset state to the other value "1". Further, the arithmetic operation circuit 71 checks whether or not a high luminance light emitting display area unit wherein the value $x_{U-max(q,p)}$ of the display area unit internal maximum input signal is equal to or higher than the second prescribed value PD2 exists around any of the low luminance light emitting display area units. If such a luminance light emitting display area unit as just mentioned exists, then the position (p,q) of it is stored into the storage device 72, and the high luminance light emitting display area unit existence flag is changed from the initial value "0" already in a reset state to the other value "1".

It is to be noted that, in the working example 2, where a high luminance light emitting display area unit is adjacent or contiguous to a low luminance light emitting display area unit in any one of all eight directions of the low luminance light emitting display area unit, it is decided that a high luminance light emitting display area unit exists around a low luminance light emitting display area unit. The state of input signals for controlling the light transmission factor (numerical aperture) of the pixels which form a display area unit where the low luminance light emitting display area unit existence flag is "1" and the high luminance light emitting display area unit existence flag is "1" and the state of the light source luminance (light source luminance 1) in this state are similar to those described hereinabove with reference to FIGS. 1A and 1B.

[Step 220]

Then, where the low luminance light emitting display area unit existence flag is "1" and the high luminance light emitting display area unit existence flag is "1", a process of increasing the luminance of the light source unit corresponding to each low luminance light emitting display area unit is performed. In this instance, a step similar to the step 120 in the working example 1 is executed. The state of the light source luminance (light source luminance 2) in the state obtained in this manner and the state of the display luminance are similar to those described hereinabove with reference to FIGS. 1C and 1D.

On the other hand, also where the low luminance light emitting display area unit existence flag is "0" or where the high luminance light emitting display area unit is "0", a step similar to the step 120 in the working example 1 is executed.

[Step 230]

Further, steps similar to the step 130 and the step 140 in the working example 1 are executed, thereby completing the image display operation for one image display frame.

Working Example 3

The working example 3 relates to a display apparatus and a driving method therefor according to a third embodiment which is an example of embodiments of the present invention. In the working example 3, the backlight control section 70 and the light source unit drive circuits 80 which correspond to a control section perform a process of increasing the luminance such that the luminance is increased by a greater amount for the light source unit corresponding to that of the low luminance light emitting display area units which is nearer to the high luminance light emitting display area unit. This process is executed where the ratio (RT1) of low luminance light emitting display area units is equal to or higher than a predetermined value (RT0) and a high luminance light emitting display area unit which is adjacent a plurality of (in the working example 3, R=2) successive low luminance light emitting display area units exists.

In the following, the driving method for the display apparatus in the working example 3 is described with reference to FIGS. 2 and 3.

[Step 300]

First, a step similar to the step 100 in the working example 1 is executed.

[Step 310]

Then, a step similar to the step 110 in the working example 1 is executed to store the values $x_{U-max(q,p)}$ of the display area unit internal maximum input signal at all of the display area units 12$_{(q,p)}$ into the storage device 72.

Simultaneously, the arithmetic operation circuit 71 determines the ratio RT1 of those low luminance light emitting display area units wherein the value $x_{U-max(q,p)}$ of the display area unit internal maximum input signal is equal to or lower than the first prescribed value PD1 for all of the P×Q display area units. Then, if the ratio RT1 of the low luminance light emitting display area units is equal to or higher than the predetermined value RT0, then the positions (p,q) of the low luminance light emitting display area units are stored into the storage device 72 and the low luminance light emitting display area unit existence flags are changed from the initial value "0" already in a reset state to the other value "1". Further, the arithmetic operation circuit 71 checks whether or not a high luminance light emitting display area unit wherein the value $x_{U-max(q,p)}$ of the display area unit internal maximum input signal is equal to or higher than the second prescribed value PD2 exists adjacent to a plurality of successive low luminance light emitting display area units. If such a high luminance light emitting display area unit as just described exists, the position (p,q) of it is stored into the storage device 72 and the high luminance light emitting display area unit existence flag is changed from the initial value "0" already in a reset state to the other value "1".

Figure 2A:
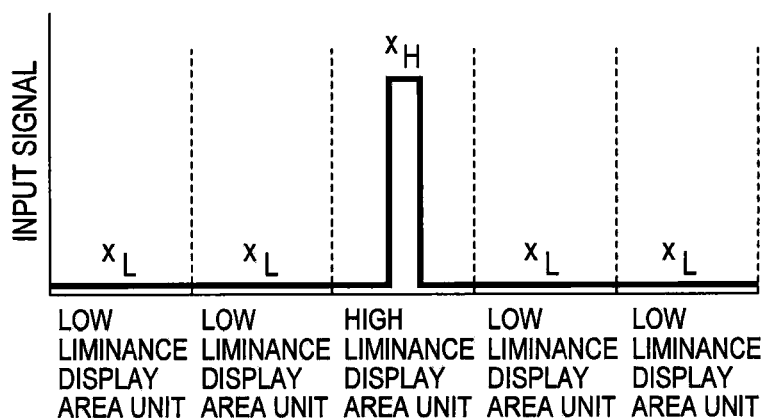
FIGS. 2A to 2D are diagrammatic views illustrating a state of the light transmission factor (numerical aperture), states of the light source luminance and a state of the display luminance at pixels which compose display area units, respectively, and illustrating a driving method for a display apparatus according to a working example 3.
Figure 2B:
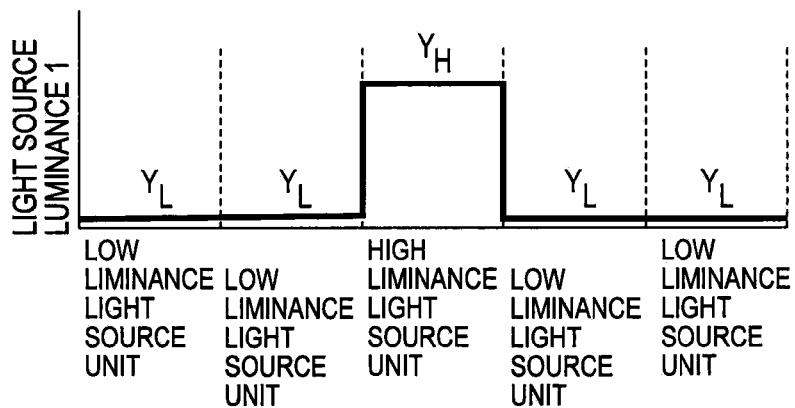

It is to be noted that, also in the working example 3, where a high luminance light emitting display area unit is adjacent or contiguous to a plurality of low luminance light emitting display area units in any one of all eight directions of the low luminance light emitting display area units, it is decided that a high luminance light emitting display area unit exists around a low luminance light emitting display area unit. The state of input signals for controlling the light transmission factor (numerical aperture) of the pixels which form a display area unit where the low luminance light emitting display area unit existence flag is "1" and the high luminance light emitting display area unit existence flag is "1" and the state of the light source luminance (light source luminance 1) in this state are illustrated in FIGS. 2A and 2B.

[Step 320]

Then, where the low luminance light emitting display area unit existence flag is "1" and the high luminance light emitting display area unit existence flag is "1", a process of increasing the luminance of the light source units corresponding to the low luminance light emitting display area units is performed, and particularly the following process is executed. In particular, in the working example 3, the number of successive low luminance light emitting display area units is set to two, and it is assumed that, in the light source unit corresponding to the rth (r=1 or 2) low luminance light emitting display area unit from between the two successive low luminance light emitting display area units (first low luminance light emitting display area unit and second low luminance light emitting display area unit) with reference to the position of a high luminance light emitting display area unit, control signals [R, G, B] corresponding to the display area unit internal maximum input signal (whose value is $x''_{U\text{-}max}$(r)) are supplied to the sub-pixels [R, G, B]. Further, also it is assumed that the light transmission factor (numerical aperture) of the sub-pixels [R, G, B] at this time is corrected to the light transmission factor first prescribed value Lt1. In this instance, the process is performed such that a light source luminance Y2(r)" of the light source unit for making the luminance of the sub-pixels [R, G, B] equal to the light source luminance Y2 is obtained. Here, the value $x''_{U\text{-}max}$(r) of the display area unit internal maximum input signal should satisfy $$x''_{U\text{-}max}(r) = \beta 1^r \cdot x\text{MAX} \text{ (where } 0 < \beta 1 < 1)$$

or $$x''_{G\text{-}max}(r) = (1 - \beta 2 \cdot r) x\text{MAX} \text{ (where } 0 < \beta 2 < 1)$$

Figure 2C:
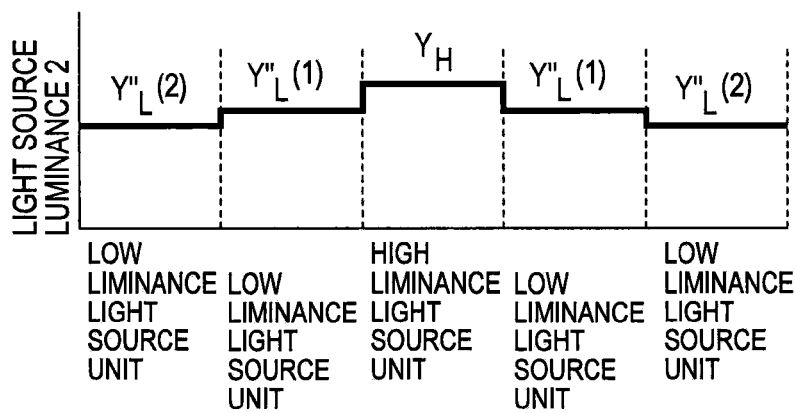
Figure 2D:
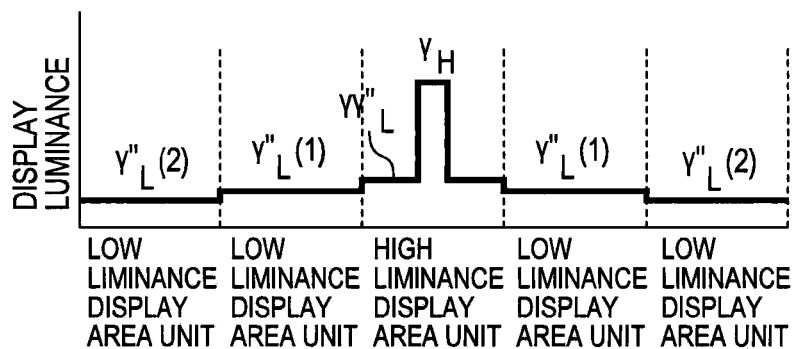

The state of the light source luminance (light source luminance 2) in this state is schematically illustrated in FIG. 2C, and the state of the display luminance is illustrated in FIG. 2D. In FIGS. 2C and 2D, the light source luminance of the light source unit corresponding to the value $x''_{U\text{-}max}$ of the display area unit internal maximum input signal is represented by YL(r)", and the display luminance is indicated by yL(r)". Further, the display luminance of the other pixels which compose a high luminance light emitting display area unit is indicated by yyL".

On the other hand, also where the low luminance light emitting display area unit existence flag is "0" or the high luminance light emitting display area unit existence flag is "0", a step similar to the step 120 in the working example 1 may be executed.

[Step 330]

Further, steps similar to those of the step 130 and the step 140 in the working example 1 are executed to complete the image display operation for one image display frame.

While the present invention has been described with reference to the preferred working examples thereof, the present invention is not limited to the working examples. The configuration and the structure of the transmission type color liquid crystal display apparatus, backlight, light source unit, display apparatus and control section described hereinabove in connection with the working examples are illustrative and also the members, materials and so forth from which they are configured are illustrative, and can be altered or modified suitably. For example, the temperature of each light emitting diode may be supervised by means of a temperature sensor and a result of the supervision may be fed back to the light source unit drive circuits 80 to perform luminance compensation (correction) or temperature control of the light source units 42. While, in the working examples, it has been described under the assumption that the display area of the liquid crystal display apparatus is divided into P×Q virtual display area units, as occasion demands, the transmission type liquid crystal display apparatus may have a structure that the display area is divided into P×Q actual display area units.

Further, in the working examples described above, when a high luminance light emitting display area unit having a display area unit internal maximum input signal whose value is a second prescribed value higher than a first prescribed value exists around a low luminance light emitting display area unit with regard to which the display area unit internal maximum input signal has a value lower than the first prescribed value, a process of increasing the luminance of the light source unit corresponding to the low luminance light emitting display area unit is performed. However, the luminance of a light source unit corresponding to a low luminance light emitting display area unit may be controlled based not only on the value of the maximum input signal in the display area unit but also on average luminance level information or luminance distribution (histogram) information of input signals in the display area unit. For example, an image which is likely to be observed as if a black display portion thereof were partly afloat because of images of high luminance are distributed unevenly or the like may be detected from luminance distribution (histogram) information of input signals in a display area unit to control the luminance of light source units. Further, the luminance of each light source unit may be controlled from the value of the maximum input signal and an average luminance level in a display area unit.

It should be understood by those skilled in the art that various modifications, combinations, sub-combinations and alterations may occur depending on design requirements and other factors insofar as they are within the scope of the appended claims or the equivalent thereof.

What is claimed is:

1. A display apparatus, comprising:
    a display section formed from a liquid crystal display apparatus of a transmission type having a display area formed from pixels arranged in a matrix;
    a backlight formed from a plurality of light source units disposed individually corresponding to a plurality of display area units which form the display area and configured to illuminate a back side of said display section;
    a drive section configured to drive said display section and said backlight based on input signals received by the drive section, the input signals including image signals;
    an arithmetic operation section for generating a pulse width modulation signal; and
    a control section, included in the drive section, configured to:
    control a light emitting state of one of the light source units corresponding to one of the display area units based on the pulse width modulation signal, the pulse width modulation signal controlling pulse width modulation of the one of the light source units and being derived from an internal maximum input signal representing a maximum value from among the image signals;
        determine whether a high luminance light emitting display area unit exists;
        determine whether a low luminance light emitting display area unit exists, the low luminance light emitting display area including the one display area unit and a value of the internal maximum input signal being lower than a first prescribed value based on one of the input signals; and determine a value of a ratio between the low luminance light emitting display area unit and the display area in the display section;

wherein the high luminance light emitting display area unit includes an additional display area unit and a value of an additional internal maximum input signal being equal to or higher than a second prescribed value which is higher than the first prescribed value and is based on the additional internal maximum input signal, and wherein a luminance of the one light source unit is increased when the control section determines that: (1) the value of the ratio is greater than a predetermined value set based on a characteristic of the one light source unit; (2) the high luminance light emitting display area unit exists; and (3) the low luminance light emitting display area unit exists.

2. The display apparatus according to claim 1, wherein the luminance is increased when the one display area unit and the additional display area unit are arranged adjacent to each other in the display area.

3. The display apparatus according to claim 1, wherein the first prescribed value is equal to or lower than 25% of the maximum value of the image signals.

4. The display apparatus according to claim 1, wherein the arithmetic operation section determines the maximum value of the image signals.

5. The display apparatus according to claim 1, wherein the second prescribed value is greater than 25% of the maximum value of the image signals.

6. The display apparatus according to claim 1, wherein the luminance is increased based on the predetermined value.

7. The display apparatus according to claim 6, wherein the first prescribed value is equal to or lower than 25% of the maximum value of the image signals.

8. The display apparatus according to claim 6, wherein the second prescribed value is greater than 25% of the maximum value of the image signals.

9. The display apparatus according to claim 1, wherein a luminance of the one light source unit is increased when the control section determines that the high luminance light emitting display area unit exists adjacent to a plurality of successive low luminance light emitting display area units.

10. The display apparatus according to claim 9, wherein the luminance is increased based on the predetermined value.

11. The display apparatus according to claim 9, wherein the first prescribed value is equal to or lower than 25% of the maximum value of the image signals.

12. The display apparatus according to claim 9, wherein the second prescribed value is greater than 25% of the maximum value of the image signals.

13. A driving method for a display apparatus comprising:
receiving input signals including image signals;
generating a pulse width modulation signal;
driving a display section and a backlight based on the received input signals, the display section having a display area formed from pixels arranged in a matrix, and the backlight including a plurality of light source units disposed individually corresponding to a plurality of display area units which form the display area;

illuminating a back side of the display section based on the plurality of light source units;

controlling a light emitting state of one of the light source units corresponding to one of the display area units based on the pulse width modulation signal, the pulse width modulation signal controlling pulse width modulation of the one of the light source units and being derived from an internal maximum input signal representing a maximum value from among the image signals;

controlling a light emitting state of one of the light source units corresponding to one of the display area units based on the pulse width modulation signal and an internal maximum input signal, the pulse width modulation signal controlling the light emitting state of one of the light source units by activating or deactivating one of the image signals, and the internal maximum input signal having a maximum value from among the image signals;

determining whether a high luminance light emitting display area unit exists;

determining whether a low luminance light emitting display area unit exists, the low luminance light emitting display area including the one display area unit and a value of the internal maximum input signal being lower than a first prescribed value based on one of the input signals, wherein the high luminance light emitting display area unit includes an additional display area unit and a value of an additional internal maximum input signal being equal to or higher than a second prescribed value which is higher than the first prescribed value and is based on the additional internal maximum input signal;

determining a value of a ratio between the low luminance light emitting display area unit and the display area in the display section; and increasing a luminance of the one light source unit when the: (1) value of the ratio is greater than a predetermined value set based on a characteristic of the one light source unit; (2) high luminance light emitting display area unit exists; and (3) low luminance light emitting display area unit exists.

14. The driving method for the display apparatus according to claim 13, wherein the luminance is increased based on the predetermined value.

15. The driving method for the display apparatus according to claim 13, wherein said control section further performs the steps of:
determining whether the high luminance light emitting display area unit exists adjacent a plurality of successive low luminance light emitting display area units, wherein a luminance of the one light source unit is increased when the high luminance light emitting display area unit is determined to exist adjacent to the plurality of successive low luminance light emitting display area units.

* * * * *